(12) United States Patent
Rostami

(10) Patent No.: US 9,688,016 B2
(45) Date of Patent: Jun. 27, 2017

(54) PROTECTION MODULE ARCHITECTURE AND ALIGNMENT TOOL, SYSTEM, AND METHOD FOR PROTECTION MODULE PLACEMENT

(71) Applicant: Advanced Wireless Innovations LLC, Santa Monica, CA (US)

(72) Inventor: Ramin Rostami, Calabasas, CA (US)

(73) Assignee: Advanced Wireless Innovations LLC, Santa Monica, CA (US)

( * ) Notice: Subject to any disclaimer, the term of this patent is extended or adjusted under 35 U.S.C. 154(b) by 487 days.

(21) Appl. No.: 14/200,015

(22) Filed: Mar. 6, 2014

(65) Prior Publication Data

US 2015/0013890 A1    Jan. 15, 2015

Related U.S. Application Data

(60) Provisional application No. 61/845,709, filed on Jul. 12, 2013.

(51) Int. Cl.
| | | |
|---|---|---|
| *B29C 65/48* | (2006.01) | |
| *B32B 7/06* | (2006.01) | |
| *B32B 7/12* | (2006.01) | |
| *B32B 37/26* | (2006.01) | |
| *B32B 38/10* | (2006.01) | |
| *B32B 43/00* | (2006.01) | |
| *B29C 63/00* | (2006.01) | |
| *B29L 31/34* | (2006.01) | |
| *B29C 63/02* | (2006.01) | |

(52) U.S. Cl.
CPC .......... *B29C 63/0004* (2013.01); *B29C 63/02* (2013.01); *B29C 2063/0008* (2013.01); *B29L 2031/3437* (2013.01); *G06F 2200/1633* (2013.01); *Y10T 29/49826* (2015.01); *Y10T 29/53265* (2015.01)

(58) Field of Classification Search
USPC .................. 156/247, 249, 391; 29/428, 760; 269/289 R
See application file for complete search history.

(56) References Cited

U.S. PATENT DOCUMENTS

| | | | |
|---|---|---|---|
| 8,369,072 B1 | 2/2013 | Alonzo | |
| 8,517,367 B1* | 8/2013 | Napier | ............... B32B 37/0046 |
| | | | 269/289 R |
| 2012/0110868 A1 | 5/2012 | Abbondanzio | |
| 2012/0211168 A1 | 8/2012 | Patel | |
| 2013/0020020 A1 | 1/2013 | Liu | |
| 2013/0199950 A1* | 8/2013 | Feller | ........................ C09J 7/02 |
| | | | 206/223 |

(Continued)

OTHER PUBLICATIONS

International Search Report for PCT application PCT/US2014/046245, search report dated Nov. 4, 2014.

(Continued)

*Primary Examiner* — Sing P Chan
(74) *Attorney, Agent, or Firm* — Mintz Levin Cohn Ferris Glovsky and Popeo, P.C.

(57) ABSTRACT

A system, topology, and methods placing a protection module on one or more surfaces of a device, in particular on an electronic device. Architecture including multiple layer protection module and alignment tool. Other embodiments may be described and claimed.

32 Claims, 21 Drawing Sheets

(56) References Cited

U.S. PATENT DOCUMENTS

2014/0217862 A1* 8/2014 Rayner ............ G06F 1/1601
312/223.1

OTHER PUBLICATIONS

First Non patent reference included in PCT search report—3 pages.
Second Non patent reference included in PCT search report—3 pages.
Third Non patent reference included in PCT search report—1 pages.

* cited by examiner

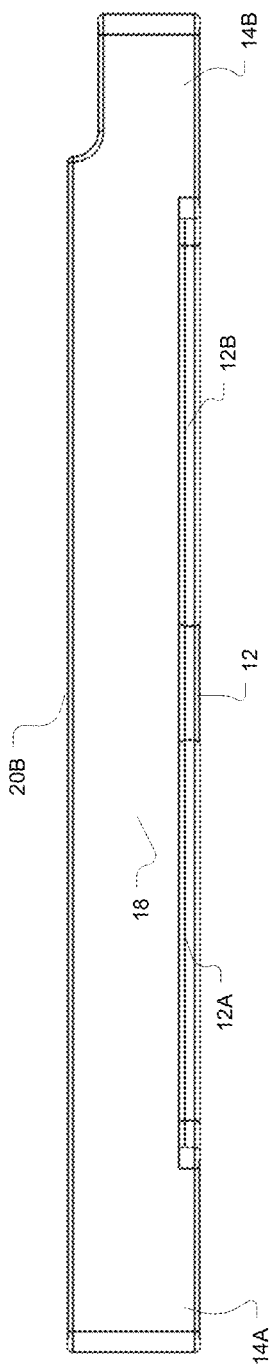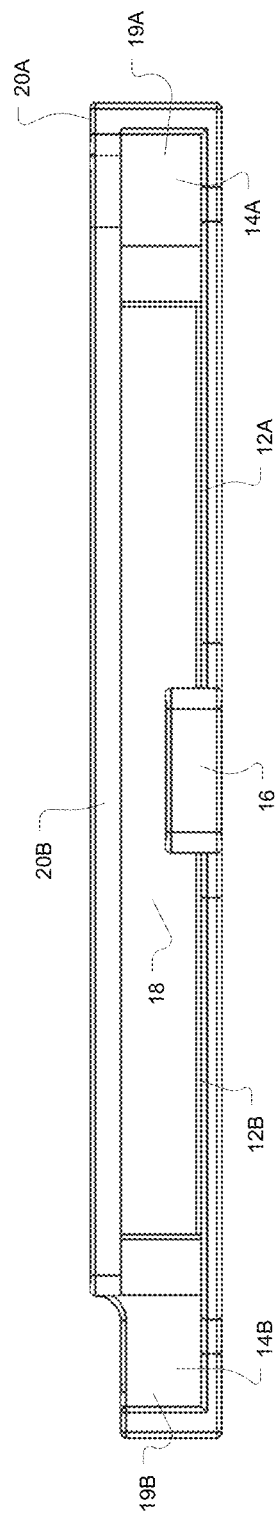

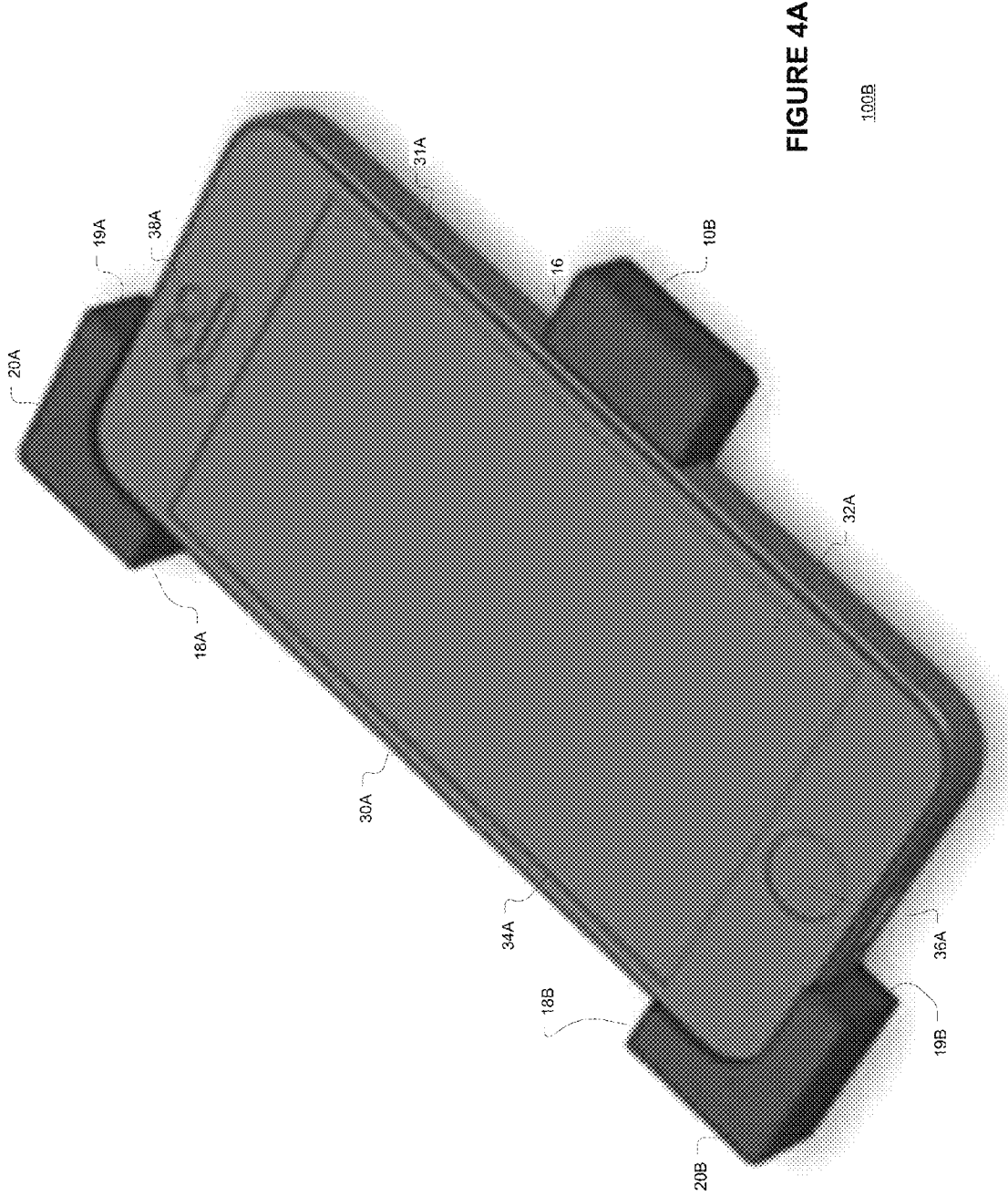

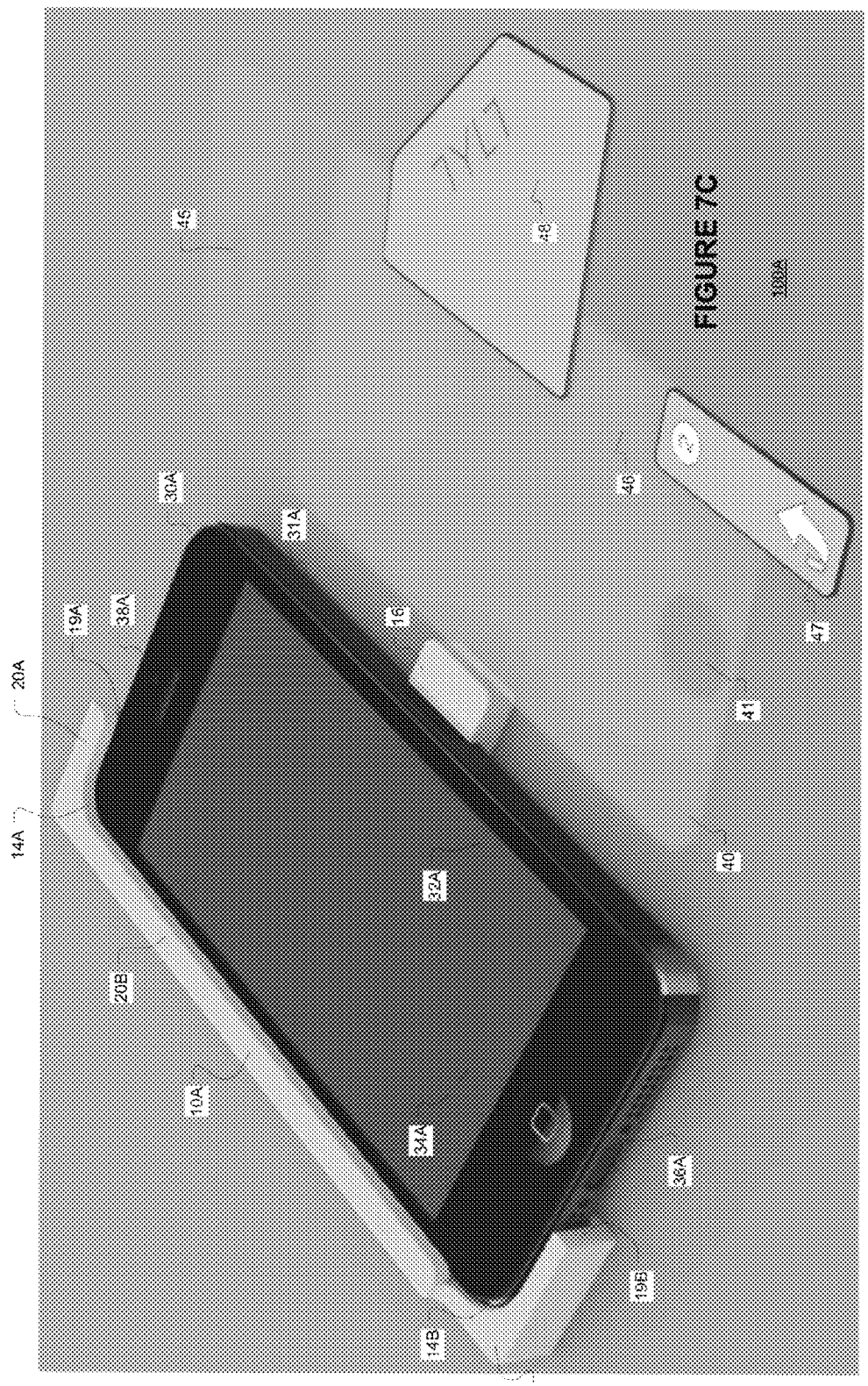

100A

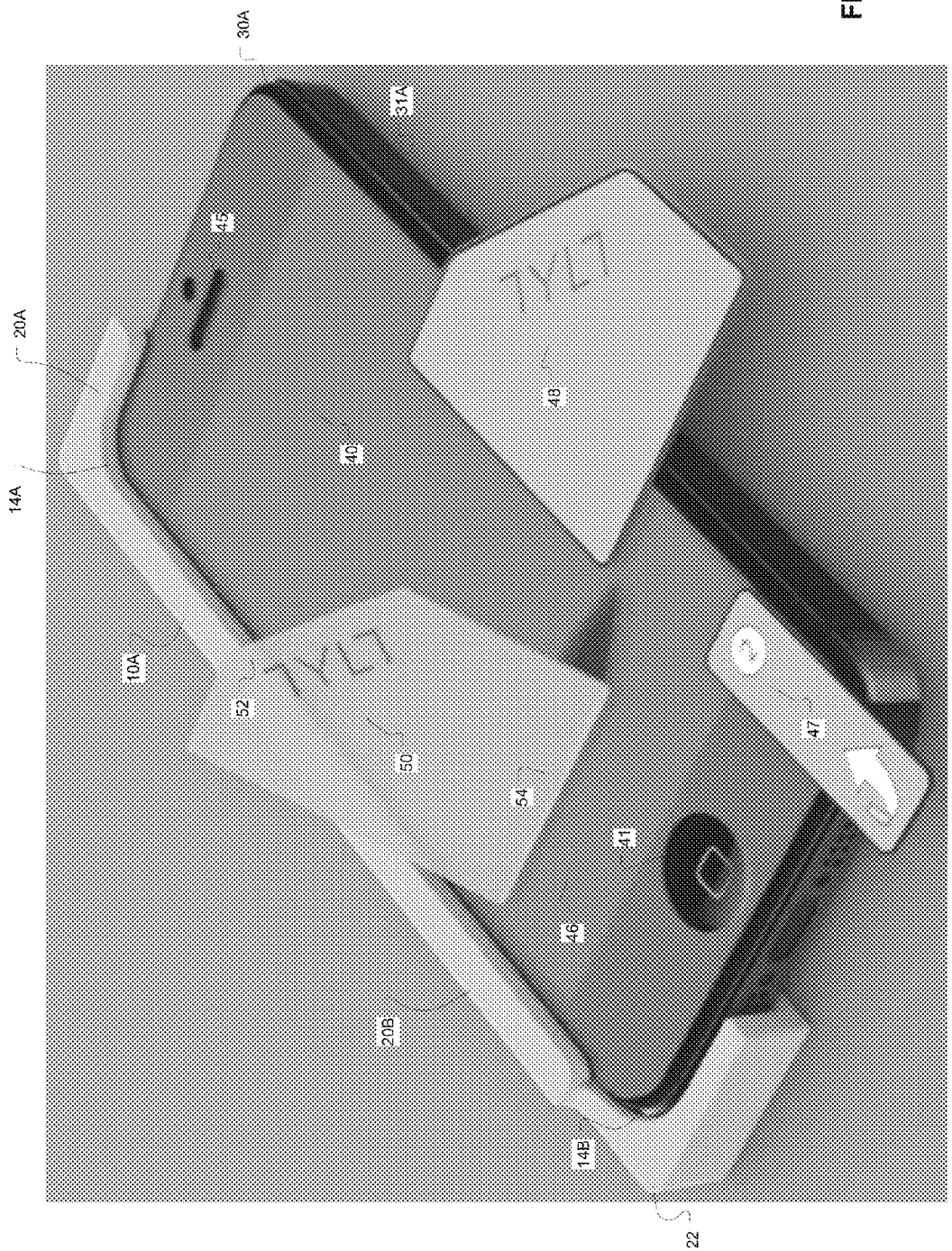

US 9,688,016 B2

PROTECTION MODULE ARCHITECTURE AND ALIGNMENT TOOL, SYSTEM, AND METHOD FOR PROTECTION MODULE PLACEMENT

CROSS REFERENCE TO RELATED APPLICATIONS

The present application claims priority to application Ser. No. 61/845,709, entitled "ALIGNMENT TOOL, SYSTEM, AND METHOD FOR PROTECTION MODULE PLACEMENT", and filed on Jul. 12, 2013 the application is considered as being part of the disclosure of the accompanying application and is hereby incorporated herein by reference.

TECHNICAL FIELD

Various embodiments described herein relate to apparatus, system, and method for accurately placing a protection module on a surface and a protection system and architecture.

BACKGROUND INFORMATION

It may be desirable to place a protection module on one or more surfaces of a device, in particular on an electronic device. The module may need to be precisely placed on the device surface to enable proper functioning of the device. The present invention provides a system, apparatus, method and architecture for same.

BRIEF DESCRIPTION OF THE DRAWINGS

FIG. 1F is a simplified left diagram of a PMP-AT according to various embodiments.

FIG. 1G is a simplified right diagram of a PMP-AT according to various embodiments.

FIG. 4A is a simplified isometric diagram of PMP architecture according to various embodiments.

FIG. 7C is a simplified isometric diagram of PMP architecture including a protection module being advanced at an angle to a first registration extension of a protection module placement alignment tool (PMP-AT) according to various embodiments.

FIG. 7I is a simplified isometric diagram of PMP architecture including a protection module coupled device surface and a squeegee being pressed against the placement module according to various embodiments.

DETAILED DESCRIPTION

Figure 1A:
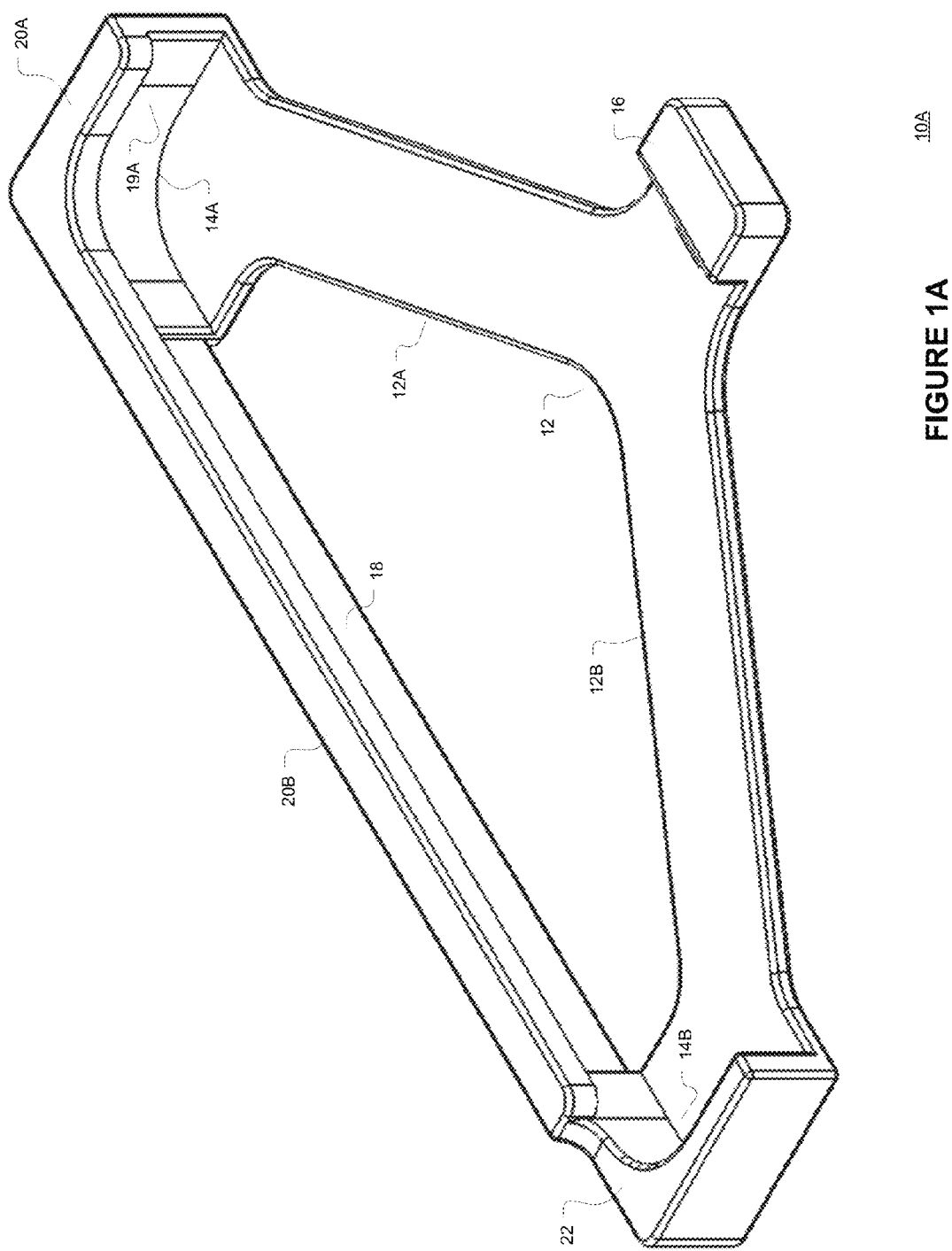
FIG. 1A is a simplified isometric diagram of a protection module placement alignment tool (PMP-AT) according to various embodiments.

FIG. 1A is a simplified isometric diagram of a protection module placement (PMP) alignment tool (AT) (PMP-AT) 10A according to various embodiments. The PMP-AT may be employed to place a protection module on a device. In an embodiment, a protection module, such as module 40 shown in FIGS. 5A-B may be desirable and precisely placed on a surface 34A of a device 30A. In an embodiment, the device 30A may be an electronic device having a surface 34A with elements (screen 32A) that a user 130 may want to protect. In such an embodiment, a user 130 may want to place a protection module 40 protection layer 49 securely to the device 30A surface 34A to protect the surface 34A and one or more elements 32A.

Figure 2:
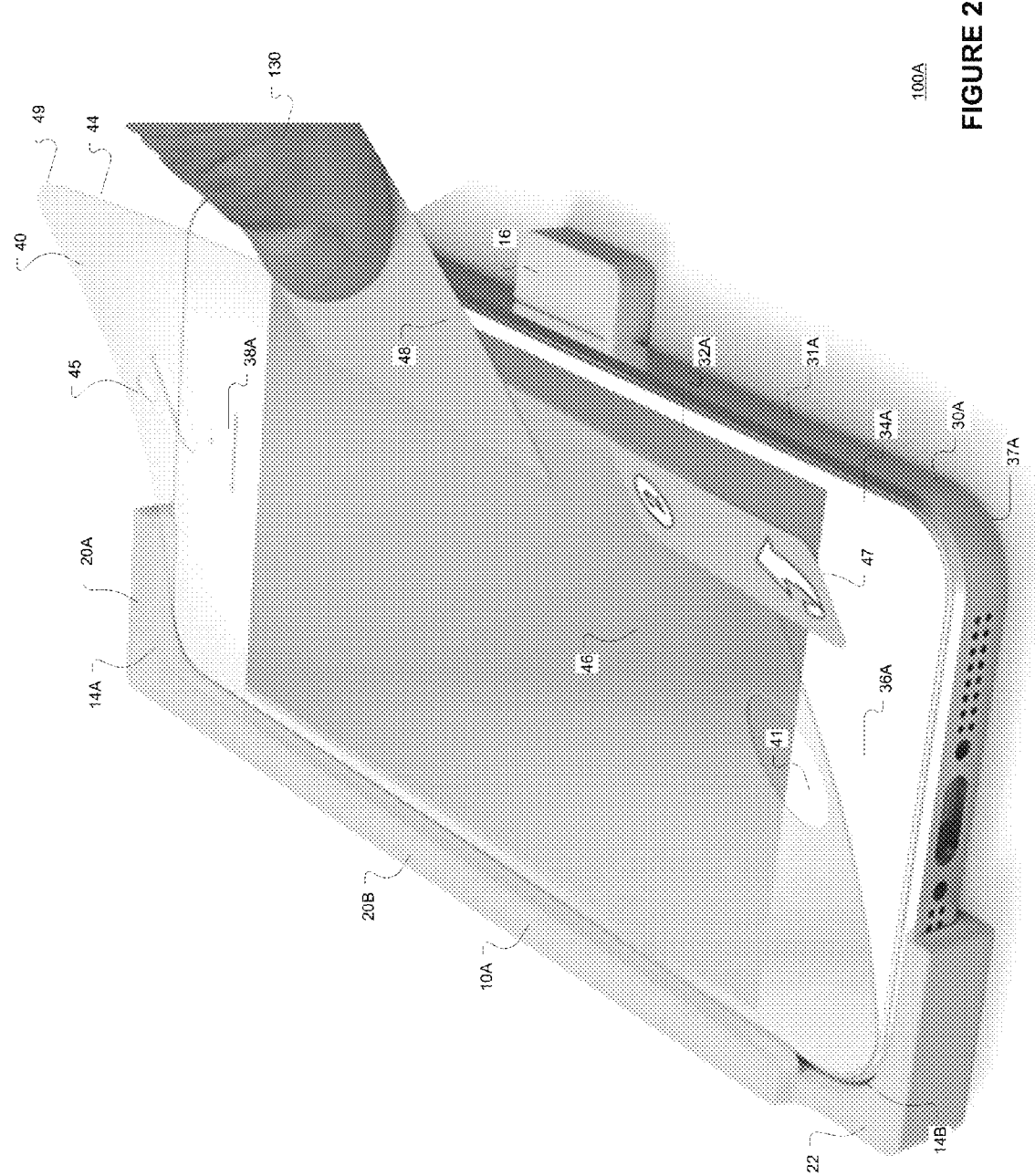
FIG. 2 is an isometric image of PMP architecture according to various embodiments.

As shown in FIG. 2, a device 30A surface 34A may have other elements 36A, 38A that a user 130 may not want to cover. A protection module 40 layer 49 may include opening or ports 41, 45 that are shaped to align with the device 30A elements 36A, 38A. Precisely placing the protection module 40 layer 49 so the ports 41, 45 co-align with the elements 36A, 38A may be difficult. The present invention provides a PM 40 and alignment tool (PMP-AT) that enable a user to precisely and accurately place a cover 49 on a device 30A surface 34A with ports 41, 45 that have tight tolerances or sizing for the device 30A elements 36A, 38A that are desirably not covered. In an embodiment, the PMP-AT may enable a user 130 to place a screen protection module 50 onto a portable electronic device 30A, 30B screen 32A, 32B.

In an embodiment, the protection module 40 may include an adhesive section or layer 44. The adhesive employed in the adhesive section 44 may be selected to removably, semi-permanently, or permanently engage a device 30A, 30B surface 34A, 34B. Attempting to remove a partially coupled protection module 40 during deployment on a device 30A, 30B may be difficult. Removing a partially coupled protection module 40 may also damage the protection module 40 Removing a partially coupled protection module 40 may also damage a device 30A, 30B or leave adhesive residue on the device 30A, 30B surface 34A, 34B. The protection module 40 and the PMP-AT 10A, 10B, 10C may enable a user 130 to precisely place a protection module 40 on a device 30A, 30B surface 34A, 34B. In particular, a PMP-AT 10A, 10B, 10C may enable a user 130 to place a protection module 40 on a device 30A, 30B surface 34A, 34B without adjustments to position after a portion of the adhesive section 44 engages a device 30A, 30B surface 34A, 34B.

As shown in FIG. 1A, a protection module placement alignment tool (PMP-AT) 10A may include a central base 12, a base upper arm 12A, a base lower arm 12B, a base extension registration tab 16, an upper alignment area registration corner 14A, a lower alignment area registration corner 14B, a base central vertical extension or wall 18, a base upper horizontal extension or wall 19A, a base lower horizontal extension or wall 19B, a horizontal/upper alignment area registration extension 20A, a vertical/upper alignment area registration extension 20B, and a base flush edge 22. In an embodiment, the base 12 upper arm 12A may extend to the upper alignment area registration corner 14A. The base 12 lower arm 12B may extend to the lower alignment area registration corner 14B. The base extension registration tab 16 may be located between and offset from the base 12 upper arm 12A and the base 12 lower arm 12B. The base central vertical extension or wall 18 may extend between the upper alignment area registration corner 14A and the lower alignment area registration corner 14B.

The base upper horizontal extension or wall 19A may extend between the upper alignment area registration corner 14A and the base central vertical extension or wall 18. The base lower horizontal extension or wall 19B may extend between the lower alignment area registration corner 14B and the base upper vertical extension or wall 18A. The PMP-AT 10A base 12, upper arm 12A, lower arm 12B, upper alignment area registration corner 14A, lower alignment area registration corner 14B, base extension registration tab 16, base central vertical extension or wall 18, base upper horizontal extension or wall 19A, and base lower horizontal extension or wall 19B may be dimensioned to conform about a device outer perimeter 31A when a device 30A is positioned with the PMP-AT 10A (FIG. 2).

The PMP_AT 10A base central vertical extension or wall 18, base upper horizontal extension or wall 19A, and base lower horizontal extension or wall 19B heights may be dimensioned to the height or thickness of the device 30A. As shown in FIG. 1A, a horizontal/upper alignment area registration extension 20A may be located above and coupled to the base upper horizontal extension or wall 19A. The vertical/upper alignment area registration extension 20B may be located above and coupled to the base central vertical extension or wall 18. In an embodiment, the horizontal/upper alignment area registration extension 20A orientation may be orthogonal to the vertical/upper alignment area registration extension 20B orientation.

As shown in FIG. 1A, the horizontal/upper alignment area registration extension 20A may extend inward and beyond the width of the base upper horizontal extension or wall 19A. The registration extension 20A may be sized to ensure that a protection module 40 is placed inward from the device 30A surface 34A top edge. In an embodiment, the horizontal/upper alignment area registration extension 20A may be flush with the width of the base upper horizontal extension or wall 19A. In such an embodiment, the registration extension 20A may be sized to ensure that a protection module 40 is placed along the device 30A surface 34A top edge.

As also shown in FIG. 1A, the vertical/upper alignment area registration extension 20B may extend inward and beyond the width of the base central vertical extension or wall 18. The registration extension 20B may be sized to ensure that a protection module 40 is placed inward from the device 30A surface 34A left side edge. In an embodiment, the vertical/upper alignment area registration extension 20B may be flush with the width of the base central vertical extension or wall 18. In such an embodiment, the registration extension 20B may be sized to ensure that a protection module 40 is placed along the device 30A surface 34A left side edge.

As shown in FIG. 1A, a base lower horizontal extension or wall 19B may not include a registration extension 20A, 20B and may have an edge 22 that is configured to be flush a coupled device 30A surface 34. The PMP-AT 10A shown in FIG. 1A may be shaped for a device 30A having a substantially flat surface 34A to be protected. A PMP-AT may also be shaped for a device having a curved surface to be protected.

Figure 1C:
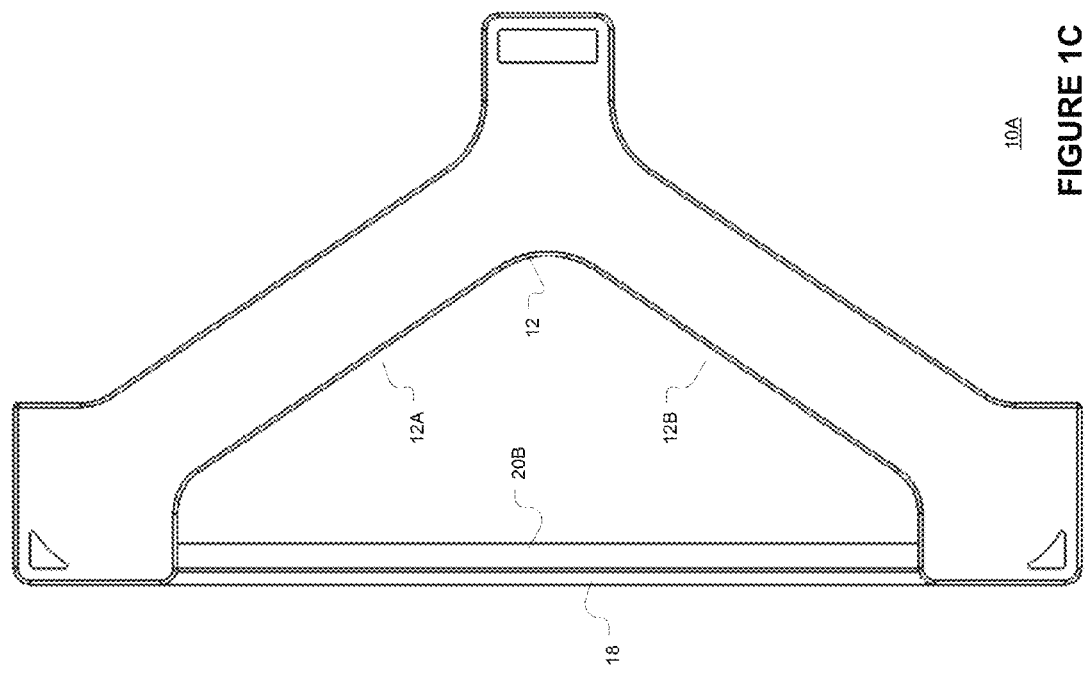
FIG. 1C is a simplified bottom diagram of a PMP-AT according to various embodiments.
Figure 1B:
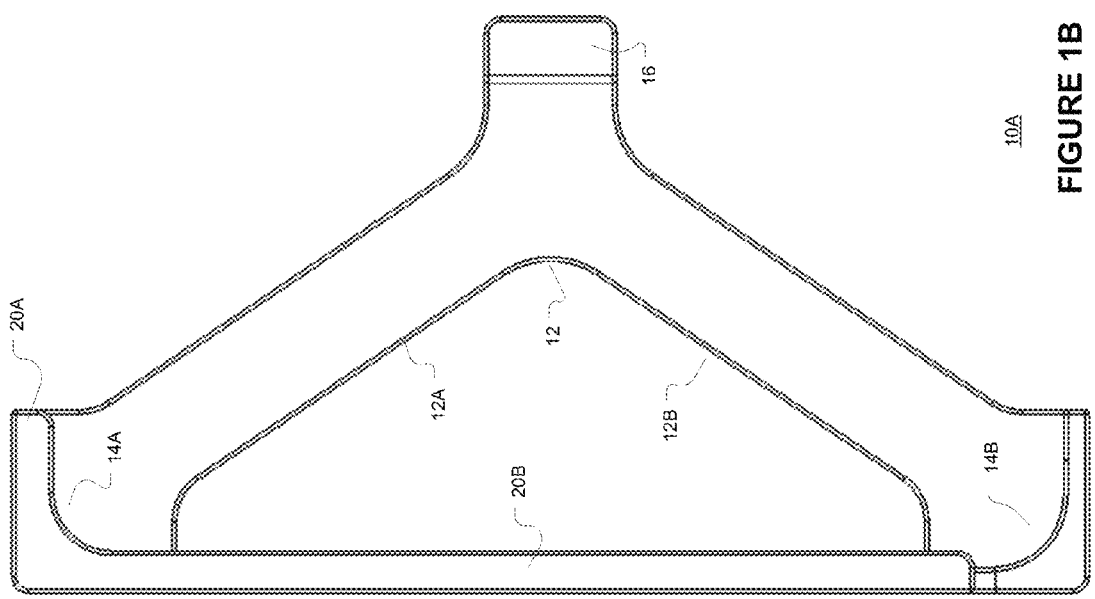
FIG. 1B is a simplified top diagram of a PMP-AT surface according to various embodiments.

FIG. 1B is a simplified top diagram of a PMP-AT 10A according to various embodiments. As shown in FIG. 1B, the vertical alignment area registration extension 20B may be located above the base central vertical extension 18. The vertical alignment area registration extension 20B may substantially extend vertically between the upper alignment area registration corner 14A and the lower alignment area registration corner 14B. The vertical alignment area registration extension 20B may also extends inwardly toward the base extension registration tab 16 to offset the vertical placement/position of the protection module 40 on a device 30A surface 34A in an embodiment.

The horizontal alignment area registration extension 20A may be located above the upper alignment area registration corner 14A and base upper horizontal extension or wall 19A. The horizontal alignment area registration extension 20A may extend inwardly toward the lower alignment area registration corner 14B to offset the horizontal placement/position of the protection module 40 on a device 30A surface 34A in an embodiment. The horizontal alignment area registration extension 20A may be oriented orthogonal to the vertical alignment area registration extension 20B. In an embodiment, the PMP_AT 10A central base 12, base upper arm 12A, base lower arm 12B, base extension registration tab 16, upper alignment area registration corner 14A, lower alignment area registration corner 14B, base central vertical extension 18, upper horizontal extension or wall 19A, lower horizontal extension or wall 19B, horizontal alignment area registration extension 20A, vertical alignment area registration extension 20B, and flush edge 22 may be sized to nest about a device 30A outer perimeter 31A while exposing a specific and exact section of a surface 34A of the device 30A to be covered by a protection module 40 layer 49.

As shown in FIG. 1B, the lower alignment area registration corner 14B may have a particular radius or shape as a function to the device(s) to be nested in the PMP-AT 10A. In an embodiment, the lower corner 14B radius or shape may be sized to nest or securely hold a corresponding corner of a device 30A while exposing at least a section of the device 30A surface 34A. In an embodiment, the lower flush edge's 22 height may be flush a section of the device 30A surface 34A (when nested in the PMP-AT 10A. Similarly, the distance between corners 14B and 14A and the distance between the wall 18 and the base extension tab 16 may be selected to enable a device's 30A perimeter 31A to nest immediately adjacent to or be securely held against the wall 18, corners 14A, 14B, and extension tab 16.

Once a device 30A is placed, inserted, or nested in a PMP-AT 10A, the PMP-AT 10A registration extensions 20A, 20B will be located at precise and registered positions on the device 30A face or surface 34A. The widths or shape of the registration extensions 20A, 20B may be selected or sized based on the face area 34 to be covered by one or more elements of a protection module 40. In an embodiment, the registration extensions 20A, 20B may be straight or curvilinear as a function of the area to be protected or the protection module 40. It is noted in an embodiment the base 12 may be solid between the registration tab 16 and walls 19A, 19B, and 18. In a further embodiment, the base 12 may be triangular, rectangular, or have other shapes. The base 12 may also extend to the corners 14A, 14B and registration tab 16.

Figure 1D:
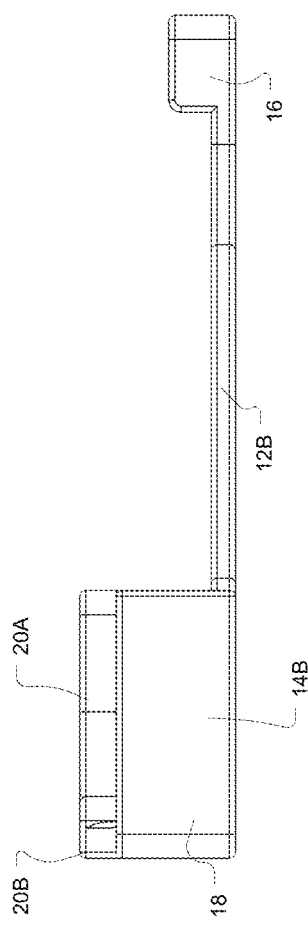
FIG. 1D is a simplified front diagram of a PMP-AT according to various embodiments.
Figure 1E:
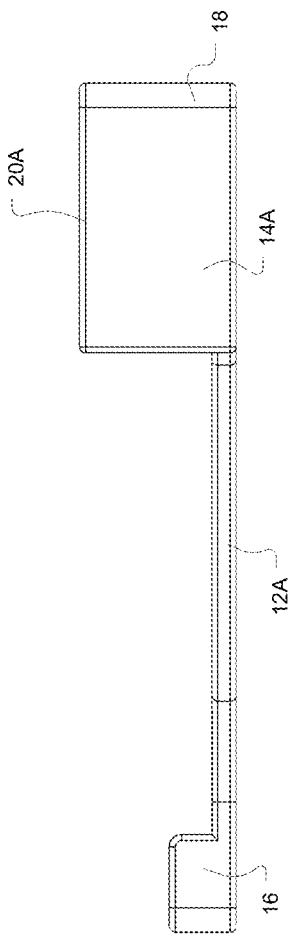
FIG. 1E is a simplified rear diagram of a PMP-AT according to various embodiments.
Figure 1H:
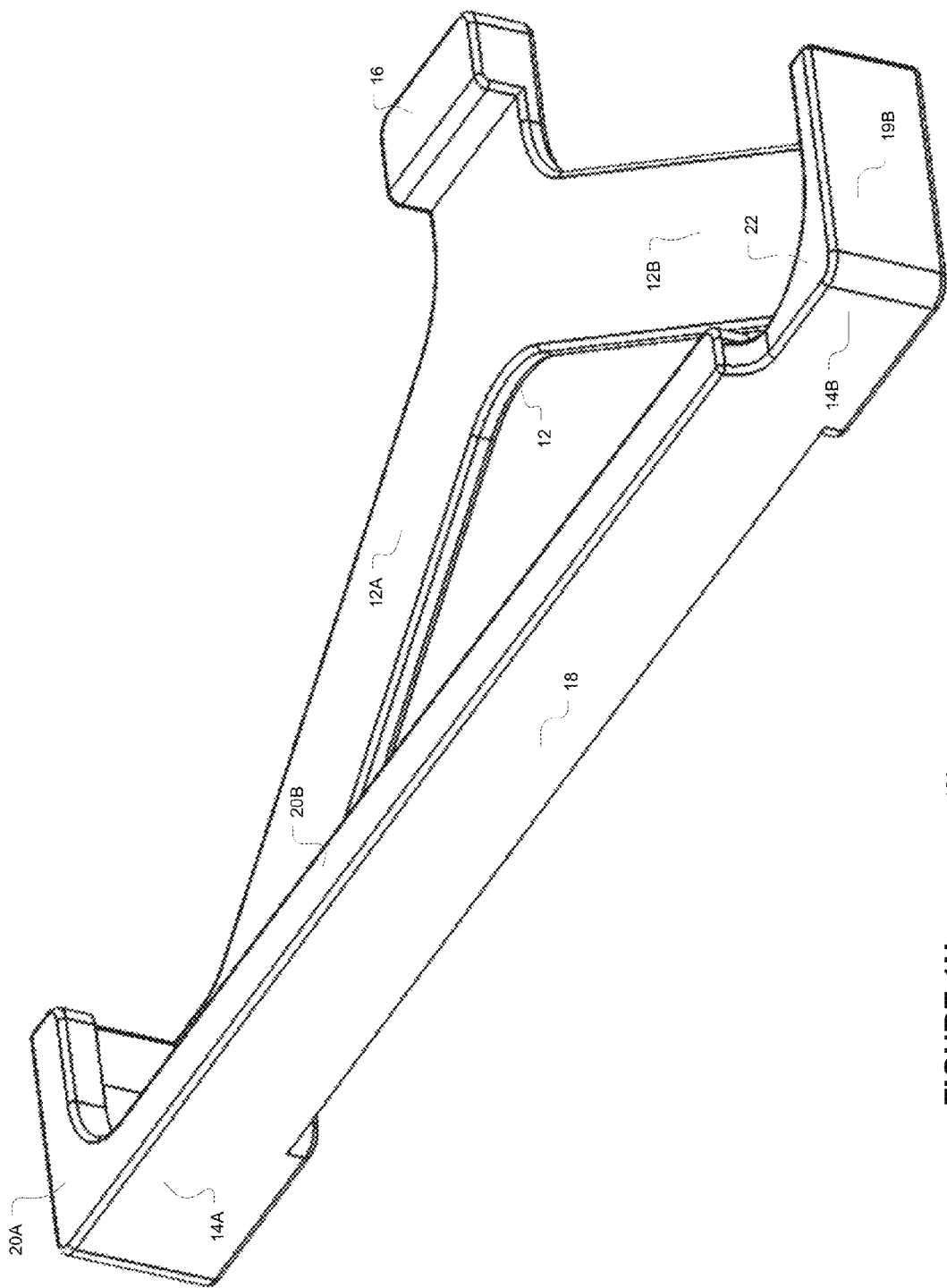
FIG. 1H is another simplified isometric diagram of a PMP-AT according to various embodiments.

FIG. 1C is a simplified bottom diagram of a PMP-AT 10A according to various embodiments. As shown in FIG. 1C, the vertical alignment area registration extension 20B may extends inwardly toward the base 12 and beyond the base central vertical extension or wall 18 width. As noted, the vertical alignment area registration extension 20B may enable a user 130 to precisely place a protection module 40 a fixed distance from a device's 30A surface 34A edge, in particular, a left edge. FIG. 1D is a simplified front diagram of a PMP-AT 10A according to various embodiments. FIG. 1E is a simplified rear diagram of a PMP-AT 10A according to various embodiments. FIG. 1F is a simplified left diagram of a PMP-AT 10A according to various embodiments. FIG. 1G is a simplified right diagram of a PMP-AT 10A according to various embodiments. FIG. 1H is another simplified isometric diagram of a PMP-AT 10A according to various embodiments. As shown in FIGS. 1D to 1H, the horizontal alignment area registration extension 20A and the vertical alignment area registration extension 20B may have an offset above the base central vertical extension wall 18 and upper horizontal extension or wall 19A. The extension's 20A, 20B offset heights may vary as a function of the protection module 40 height.

As also shown in FIGS. 1D-1H, the central base 12 extension registration tab 16 may have a height. The extension tab 16 height may vary as a function of an intended device 30A perimeter 31A height. The extension tab 16 configured or selected height may enable a user to snugly and securely insert or next a device 30A into the PMP-AT 10A in combination with the PMP-AT 10A other elements. As noted the registration extensions 20A, 20B inward sections are sized both in width, length, and shape (curved, straight, or other shape) to correspond with the edge(s) of a surface 34A region 32A of the device 30A to be covered. The desired region 32A is precisely aligned or registered via the PMP-AT 10A extensions 20A, 20B.

FIG. 2 is an isometric image of PMP architecture 100A according to various embodiments. As shown in FIG. 2, PMP architecture 100A may include a PMP-AT 10A, a device 30A, and a protection module 40. As shown in FIG. 2, the device 30A may have an outer perimeter 31A, imaging projecting and touch or capacitive sensing screen 32A, top face or surface 34A, user depressible function button 36, and speaker port 38A.

Figure 5C:
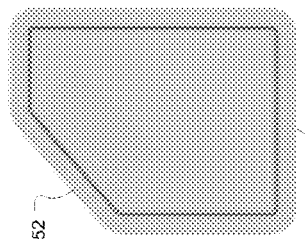
FIG. 5C is a simplified front diagram of a squeegee of a PMP architecture according to various embodiments.
Figure 5B:
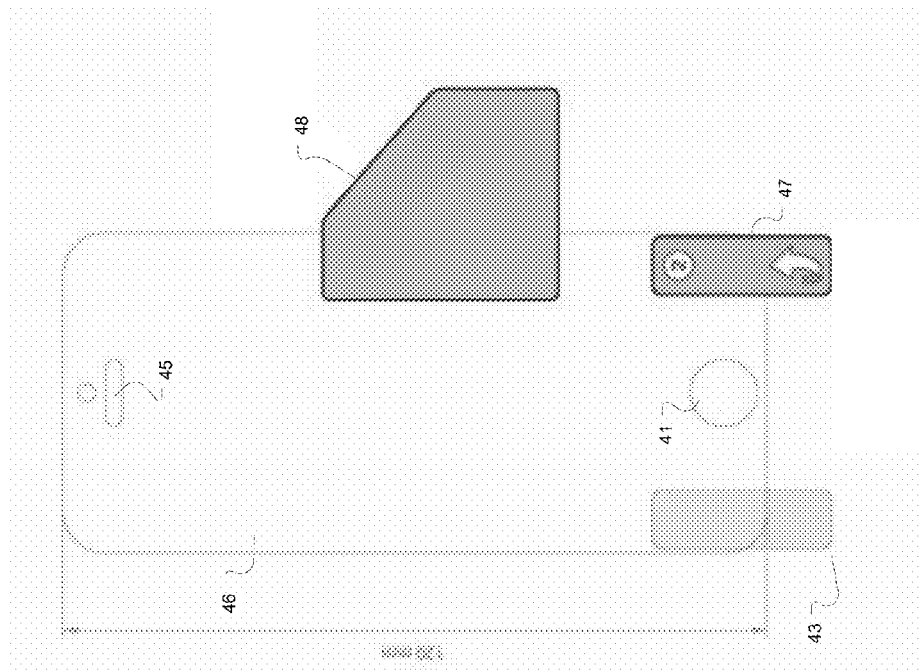
FIG. 5B is a simplified rear diagram of a protection module according to various embodiments.
Figure 5A:
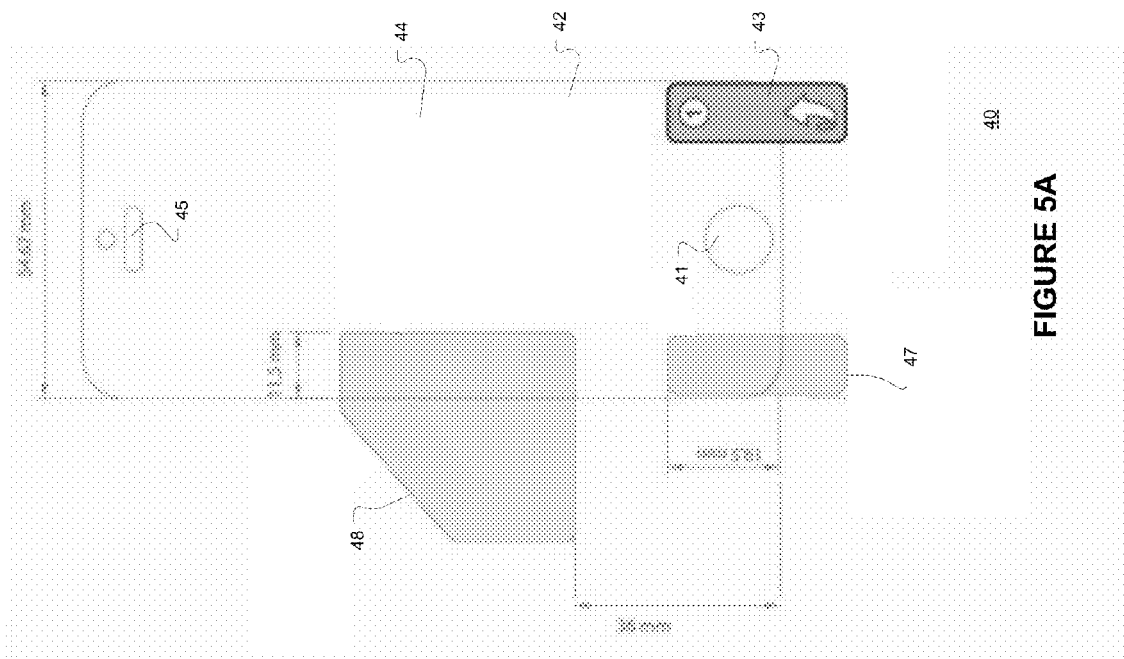
FIG. 5A is a simplified front diagram of a protection module according to various embodiments.

FIG. 5A is a simplified front diagram and FIG. 5B is a simplified rear diagram of a protection module 40 according to various embodiments. As shown in FIGS. 5A, 5B, a protection module 40 may include a lower device port opening 41, a removable back layer 42, a back layer tab 43, an adhesive section 44, an upper device port opening 45, a removable front layer 46, a front layer tab 47, a placement tab 48, and protection layer 49. In an embodiment, a protection module 40 may have four layers including a removable front layer 46, a main protection layer 49, an adhesive layer 44, and a removable back layer 42. The adhesive layer 44 may be located between the main protection layer 49 and the removable back layer 42. The removable front layer 46 may be adjacent the main protection layer 49.

In an embodiment, a protection module back layer 42 may include a tab 43. A user 130 may employ the tab 43 to remove the protection module 40 back layer 42. A user 130 may remove a protection module 40 back layer 42 to expose an adhesive section on the main protection layer 49 bottom side. A user 130 may expose the adhesive section 44 prior to placing the protection module 40 on a device 30A surface 34A. As shown in FIG. 2, FIGS. 7A-7I, and described in FIG. 6, a user 130 may employ a PMP-AT 10A, 10B, 10C to precisely place a protection module 40 on a surface 34A, 34B of a device 30A, 30B. In an embodiment, a user 130 may employ a PMP-AT 10A, 10B, 10C after the adhesive section 44 of a protection module 40 has been exposed.

As also shown in FIGS. 2, 7C-7G, and 8, a protection module 40 removable front layer 46 may also include a front layer tab 47 and placement tab 48. The removable front layer 46 may include a larger placement tab 48 located centrally between the top and bottom of the protection module 40 and along the module's 40 right edge in an embodiment. The large placement tab 48 may be secured to the removable front layer 46. As noted the front layer 46 may be removably secured to the main protection layer 49. As explained with reference to FIGS. 6, 7A-7I, and 8, a user may grasp the large placement tab 48 during the installation of the protection module 40 on a device 30A, 30B, surface 34A, 34B. In particular, a user may easily manipulate a protection module 40 with one hand (a thumb and a finger in an embodiment) via the large placement tab 48.

As shown in FIGS. 2 and 7A-7I, a PMP-AT 10A may be sized via its elements or components to securely hold a device 30A about its perimeter 31A while exposing a section 34A or 32A to be protected. As noted in an embodiment, the PMP-AT 101A elements or components may include a central base 12, a base upper arm 12A, a base lower arm 12B, an upper alignment area registration corner 14A, a lower alignment area registration corner 14B, a base extension registration tab 16, a base central vertical extension or wall 18, a base upper vertical extension or wall 18A, a base lower vertical extension or wall 18B, a base upper horizontal extension or wall 19A, a base lower horizontal extension or wall 19B, a horizontal/upper alignment area registration extension 20A, a vertical/upper alignment area registration extension 20B, and a base flush edge 22.

As shown in FIG. 2, a user may desire to cover a face portion or surface 34A of a device 30A. As shown in FIG. 2, a device 30A perimeter 31A wall may extend beyond the device's 30A upper face or surface 34A. In an embodiment, a device 30A surface 34A may include one or more ports, depressions, buttons, openings, or other device features 36A, 38A that should not a user 130 may not want to cover. In the embodiment shown in FIG. 2, the device 30A includes a user input port or interface (depressible button in one embodiment) 36A and a speaker or audio port or opening 38A.

As shown in FIGS. 2, 5A-5B, 7A-7I, and 8, a protection module's 40 adhesive section 44, and main protection layer 49 may include ports or device feature slots or openings 41 and 45. In an embodiment, the protection module's 40 removable back layer 42 and removable front layer 46 may also include ports or device feature slots or openings 41 and 45. The removable back layer 42 and removable front layer 46 may include the ports 41 and 45 to provide user visualization of the device ports 36A and 38A during an installation of the protection module 40. The visualizations may help a user 130 confirm the protection module's 40 registration or alignment with the device's ports 36A, 38A. In an embodiment, visualizations may help a user 130 confirm the protection module's 40 registration or alignment with the device's ports 36A, 38A during an installation with a PMP-AT 10A, 10B, 10C.

While a user may not want to cover a device's 30A ports or elements 36A and 38A to be covered, a user may want the protection module 40 to cover or protect the surfaces 34A immediately adjacent and about the ports or elements 36A, 38A. In an embodiment, a protection module 40 may then be formed with openings or ports 41 and 45 that correspond and register precisely with a device's 30A components, ports, or elements 36A, 38A. In order to maximize a device's 30A surface 34A coverage, the tolerance about a device's 30A elements or ports 36A, 38A are ideally small. Such small tolerances, however may made protection module 40 installation difficult for a user 130. A PMP-AT 10A, 10B, 10C, however may enable a user install a protection module 40 with ideally tight tolerances consistently and easily. Such a PMP-AT 10A, 10B, 10C and protection module 40 may cover a greater surface area (as desired) 34A of a device 30A and protect the device's 30A sometimes delicate and expensive components, including a touch sensitive screen 32A in an embodiment.

In an embodiment, a protection module 40 main protection layer 49 may be formed of one or more polymers and fibers (Teflon, Kevlar), glass, glass fibers, and other chemicals to protect the device 30 face 34 from scratches, damage from sharp edges, liquid, and sun or light damage. In an embodiment, the main protection layer 49 may be formed from several layers where different layers may provide different functionality. In a further embodiment, the main protection layer 49 may be formed from hundreds of layers where each layer is about a nanometer in thickness.

In summary and as shown in FIGS. 2, 7A-7I, and 8, a PMT-AT 10A, 10C a first alignment area registration extension 20A and second alignment area registration extension 20B may be sized so a protection module 40 layers 46, 49 edges may be placed against both registration extensions 20A, 20B at an angle relative the device's 30A, 30B surface 34A, 34b to be covered. Then the module 40 may be rotated downwardly onto a device's 30A, 30B surface 34A, 34B while two or more edges or sides of the protection module's layer 46, 49 remain adjacent or in contact with the PMP-AT's registration extensions 20A, 20B. Such a deployment process may enable a user to precisely, easily, and repeatedly place a protection module 40 on a device's 30A, 30B surface 34A, 34B. In an embodiment, a protection module 40 may be precisely placed on a device 30 face 34 section or area via the algorithm 120 shown in FIG. 6 and diagramed in FIGS. 7A-7I.

Figure 6:
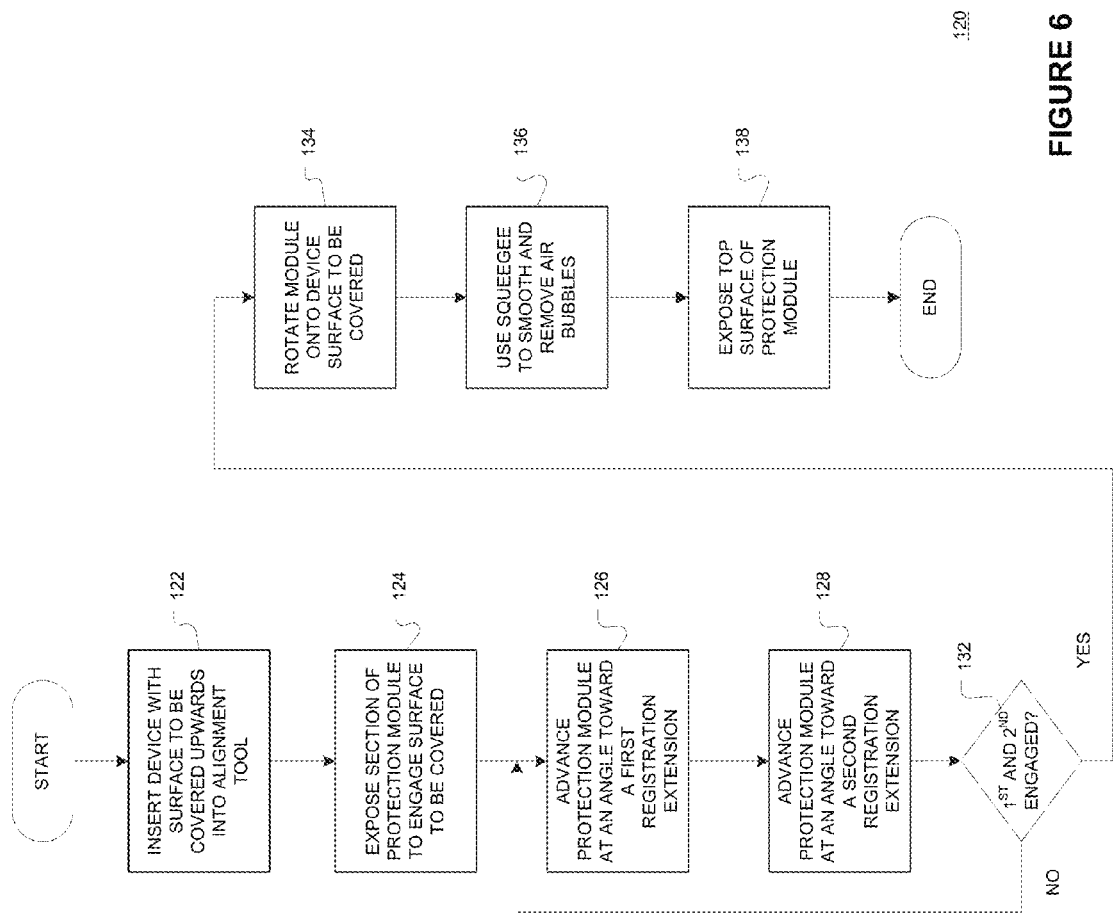
FIG. 6 is a flow diagram illustrating methods according to various embodiments.
Figure 7A:
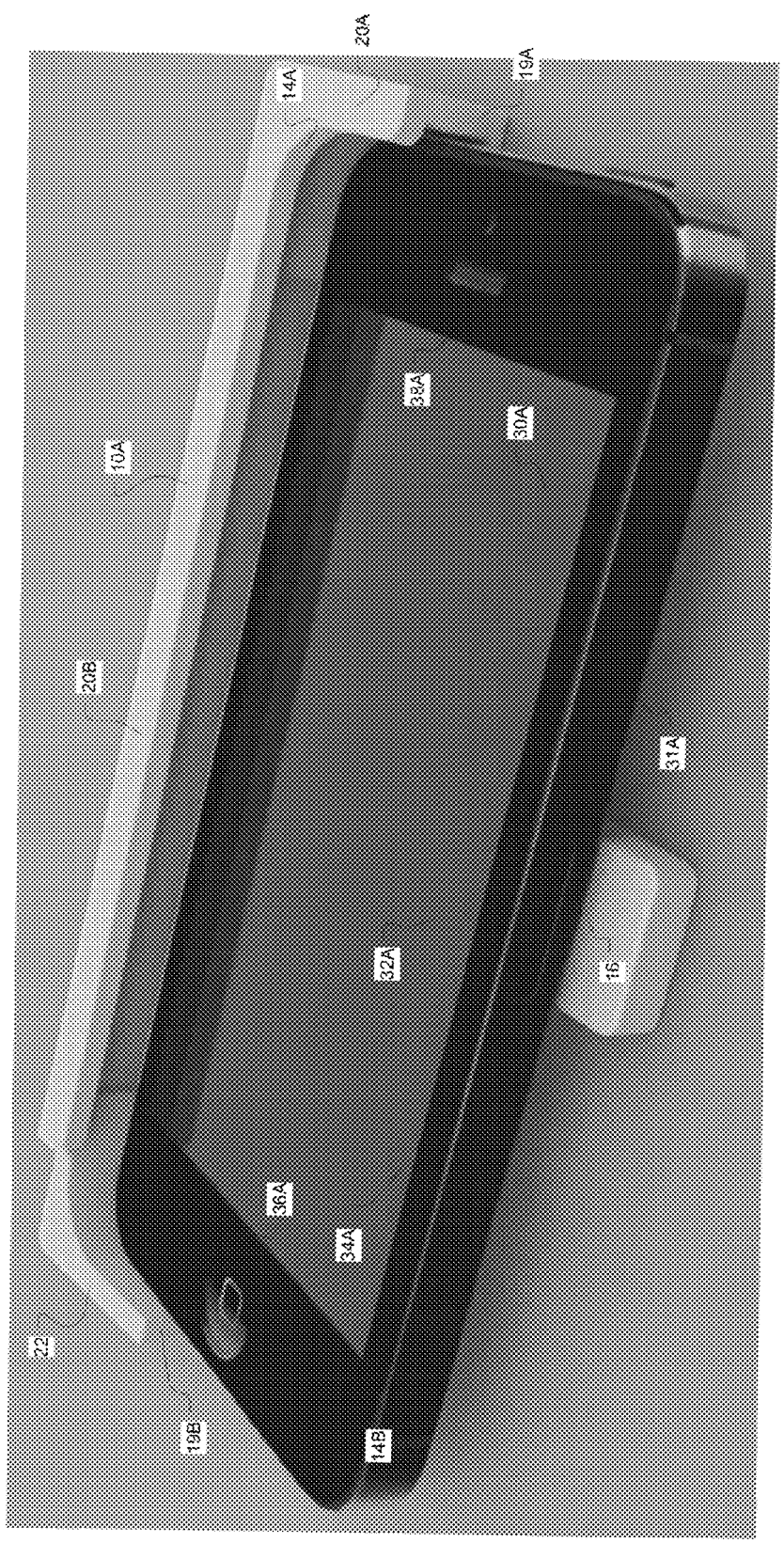
FIG. 7A is a simplified isometric diagram of protection module placement (PMP) architecture including a device being coupled to an alignment tool (AT) for PMP according to various embodiments.
Figure 7B:
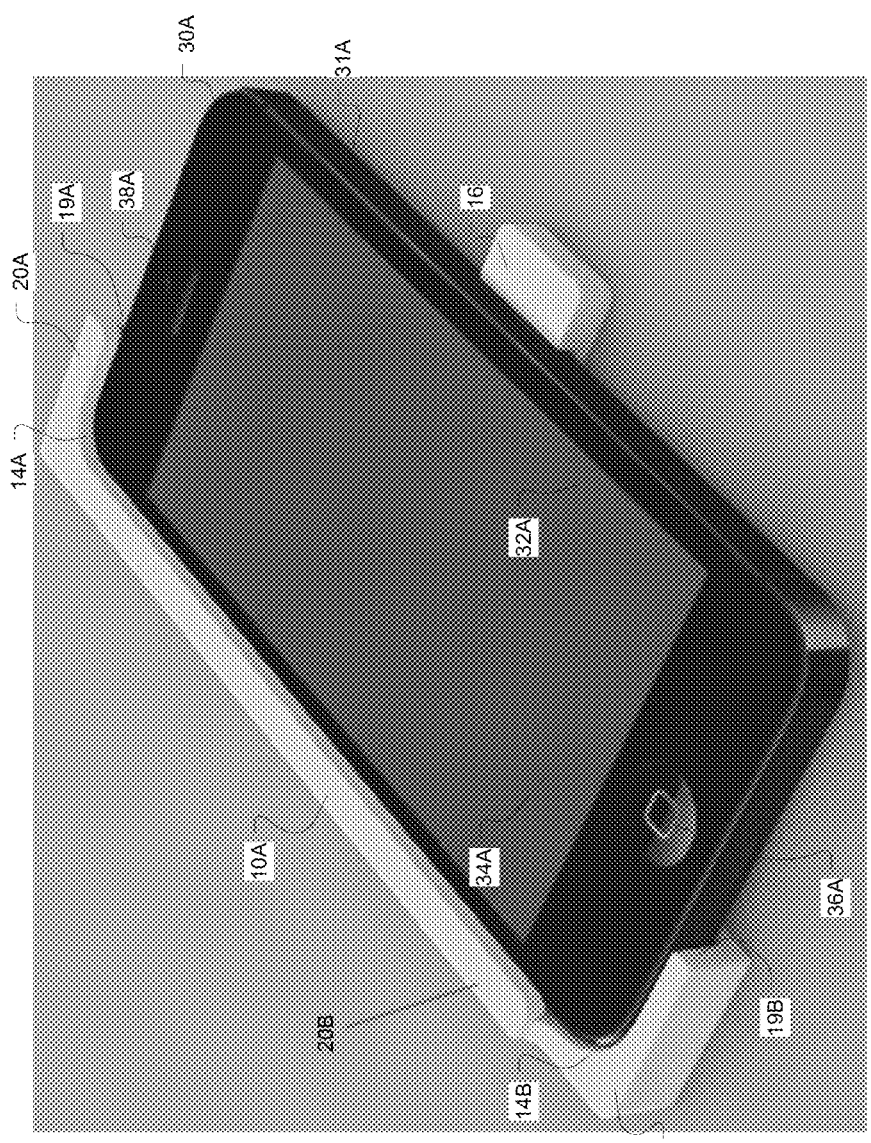
FIG. 7B is a simplified isometric diagram of protection module placement (PMP) architecture including a device coupled to an alignment tool (AT) in preparation for PMP according to various embodiments.

As shown in FIG. 7A and according to the algorithm 120 of FIG. 6, a user 130 may insert a device 30A with the surface 34A to be covered upwards into the alignment tool 10A (activity 122). As shown in FIG. 7A, a device 30A may be slide at angle into the PMP-AT 10A. A user 130 may advance a device's 30A first long perimeter edge 31A toward the PMP-AT 10A central vertical extension or wall 18 and below the horizontal/upper alignment area registration extension 20A. The user may continue to advance a device's 30A first long perimeter edge 31A toward the PMP-AT 10A central vertical extension or wall 18 and below the vertical/upper alignment area registration extension 20B until the wall 18 is engaged by the first long perimeter 31A edge. The device's second, opposite long perimeter 31A edge may also engage the PMP-AT 10A extension registration tab as shown in FIG. 7B.

The device 30A may then be precisely, repeatedly, and securely held in the PMP-AT. In particular and shown in FIG. 7B, the device's 30A outer perimeter 34A may engage the PMP-AT's 10A central base 12, base upper arm 12A, base lower arm 12B, upper alignment area registration corner 14A, lower alignment area registration corner 14B, base extension registration tab 16, base central vertical extension or wall 18, base upper horizontal extension or wall 19A, base lower horizontal extension or wall 19B, horizontal/upper alignment area registration extension 20A, and vertical/upper alignment area registration extension 20B. As shown in 7B, a device's region 32A of a surface 34A may be effectively framed by PMP-AT's 10A upper alignment area registration corner 14A, a horizontal/upper alignment area registration extension 20A, and a vertical/upper alignment area registration extension 20B.

Then a user 130 may expose an adhesive section 44 of a protection module 40 to be securely coupled to a section 34A of the device 30A (activity 124). In an embodiment, the protection module 40 may include adhesive or an adhesive section 34A between the main protection layer 49 and the removable back layer 42. In an embodiment, a user may use the back layer tab 43 to remove the back layer 42 from the protection module 40 to expose the adhesive section 44) of the protection module 40 that may engage a device's surface 34A (activity 124) such as shown in FIG. 7C. It is noted that a device 30A, 30B may be a portable electronic device including a mobile telephone, tablet computer, laptop, personal data assistant (PDA), or other electronic device. It is also noted that a PMP-AT 10A, 10B, 10C may be used to place one or more elements of a protective module 40 on a device 30A, 30B. In an embodiment, a user 130 may use a PMT-AT 10A, 10B, 10C to deploy protection module 40 on a front side section 34A, 34B and back side section (37A, 37B) or both of a device 30A, 30B. It is further noted that an alignment tool 10A, 10B, 10C may be sized and shaped for a particular model of an electronic device and other, similar alignment tools 10A, 10B may be sized and shaped for other models of the same electronic device depending on the sections 34A, 34B, 32A, 32B to be covered or protected.

Figure 7D:
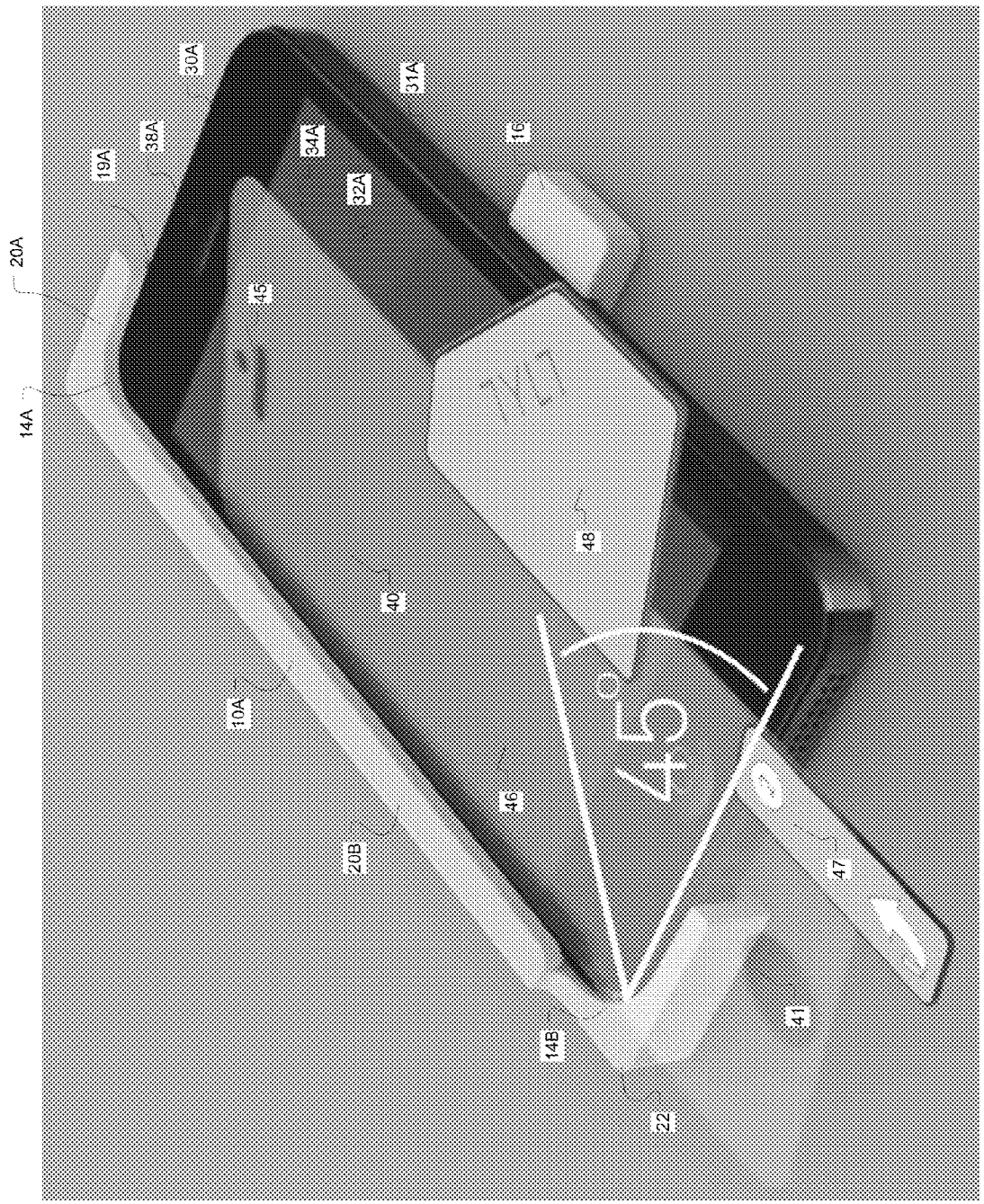
FIG. 7D is a simplified isometric diagram of PMP architecture including a protection module advanced at an angle to a first registration extension of a PMP-AT according to various embodiments.

A user 130 may then advance the remaining protection module 40 elements toward a PMP-AT 10A first alignment area registration extension 20B at an angle as shown in FIG. 7D (activity 126 of algorithm 120). The first alignment area registration extension 20A may be a horizontal/upper alignment area registration extension 20B in an embodiment. A user 130 may advance the protection module 40 at about a 45 degree angle toward a PMP-AT 10A first alignment area registration extension 20B in an embodiment. A user 130 may continue to advance the protection module 40 towards the first extension 20B until it engages the first extension 20B as shown in FIG. 7D.

Figure 7E:
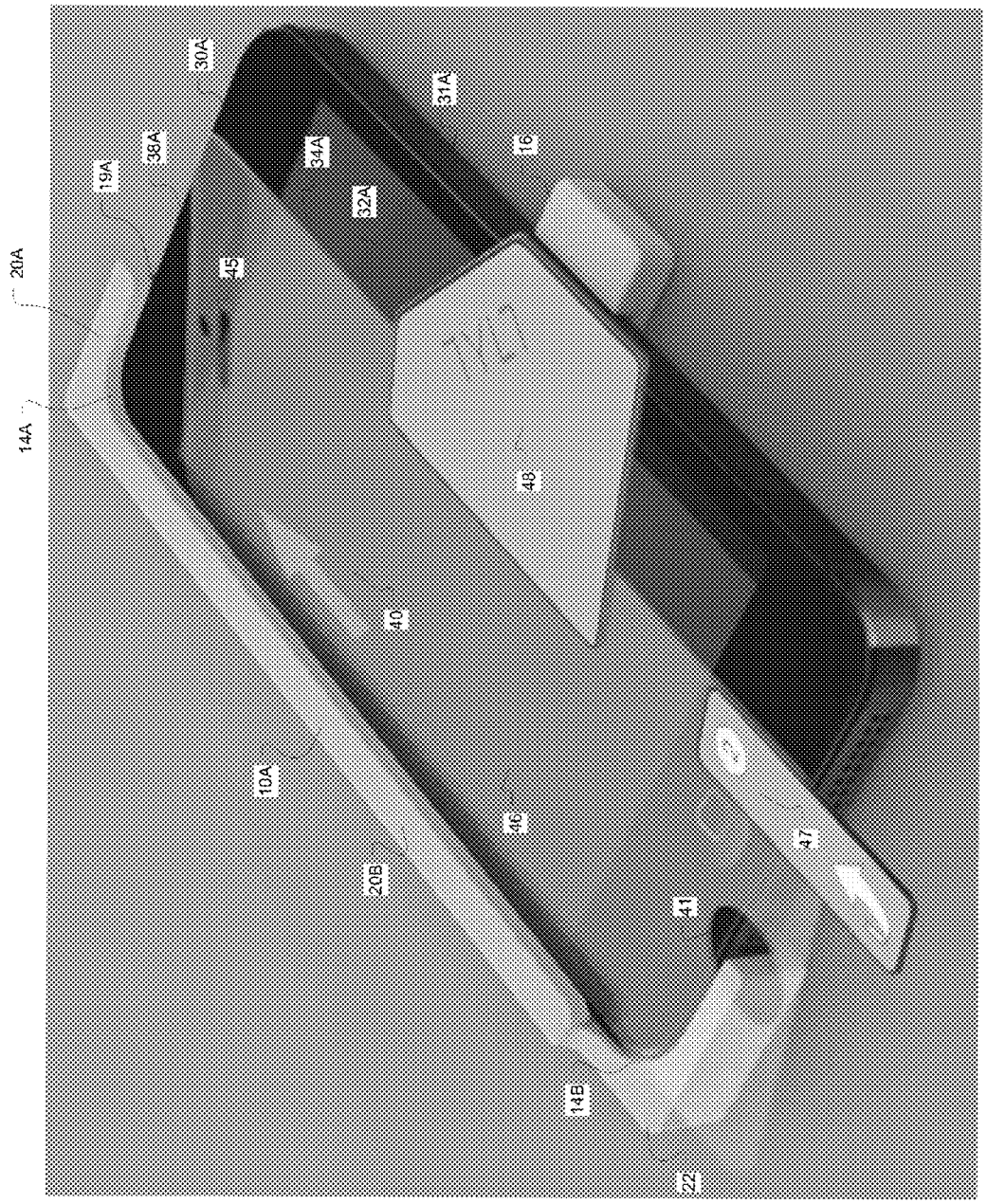
FIG. 7E is a simplified isometric diagram of PMP architecture including a protection module engaging a first registration extension at an angle and being advanced to a second, orthogonal registration extension of a PMP-AT according to various embodiments.

A user 130 may then advance the remaining protection module 40 elements toward a PMP-AT 10A second alignment area registration extension 20A (upper horizontal alignment area registration extension) at an angle while maintaining contact with the first alignment area registration extension 20B (activity 128) and as shown in FIG. 7E. It is noted that in an embodiment, a user 130 may advance a protection module 40 elements toward the vertical alignment area registration extension 20B and horizontal/upper extension 20A simultaneously. A user may advance a protection module 40 elements toward the horizontal/upper alignment area registration extension 20A first and the vertical extension 20B second in an embodiment.

Figure 7F:
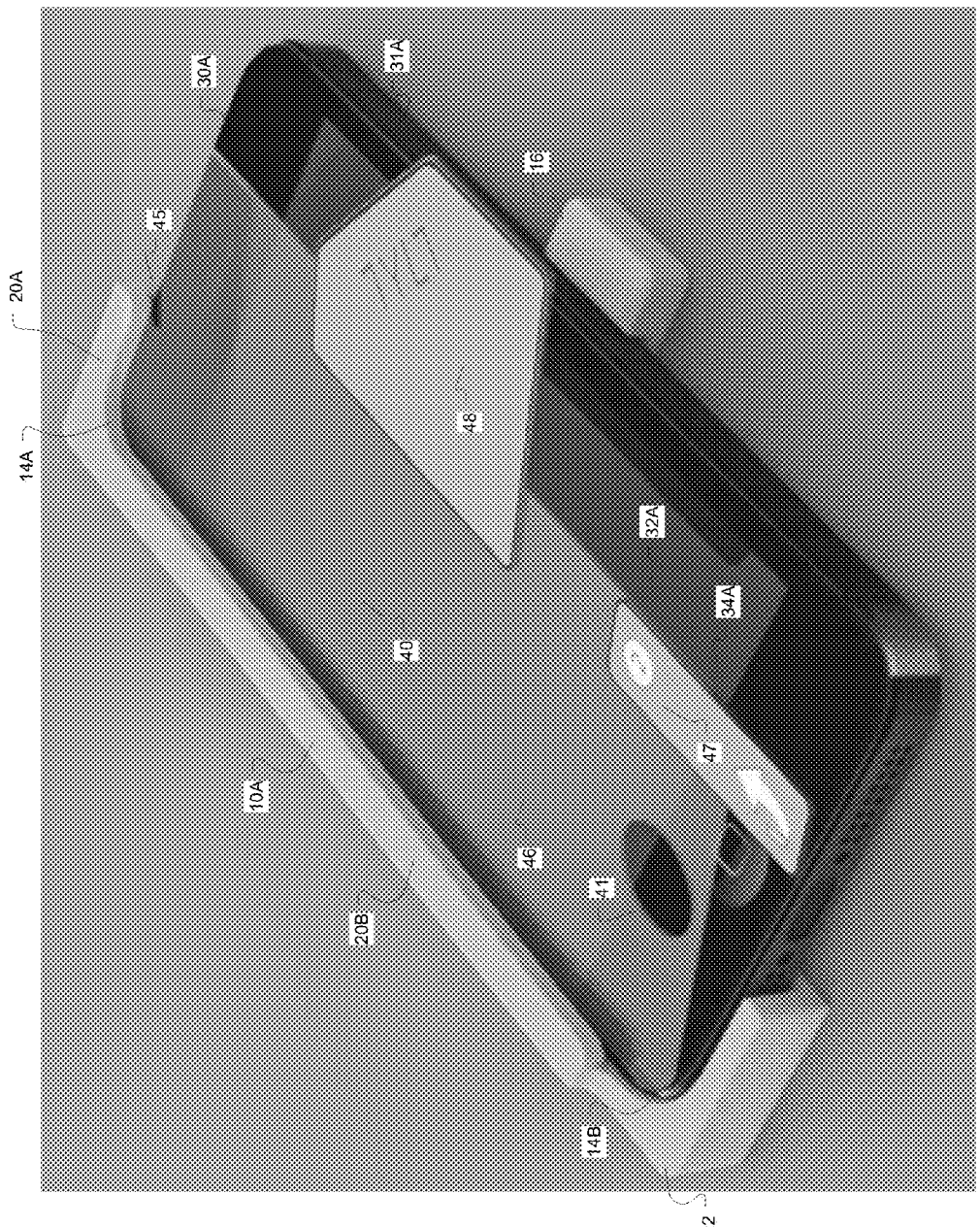
FIG. 7F is a simplified isometric diagram of PMP architecture including a protection module engaging a first registration extension at an angle and engaging a second, orthogonal registration extension of a PMP-AT according to various embodiments.

A user 130 may continue to advance the protection module 40 toward the PM-AT 10A horizontal/upper alignment area registration extension 20A until engaged as shown in FIG. 7F (activities 126, 128, and 132). In an embodiment, a user 130 may employ the large placement tab 48 to aid the protection module 40 advancement to the registration extensions 20A, 20B. Once both extensions 20A, 20B are engaged (activity 132), the protection module 40 left edge and upper edge may be precisely aligned with a device 30A surface 34A to be protected or covered.

Figure 7G:
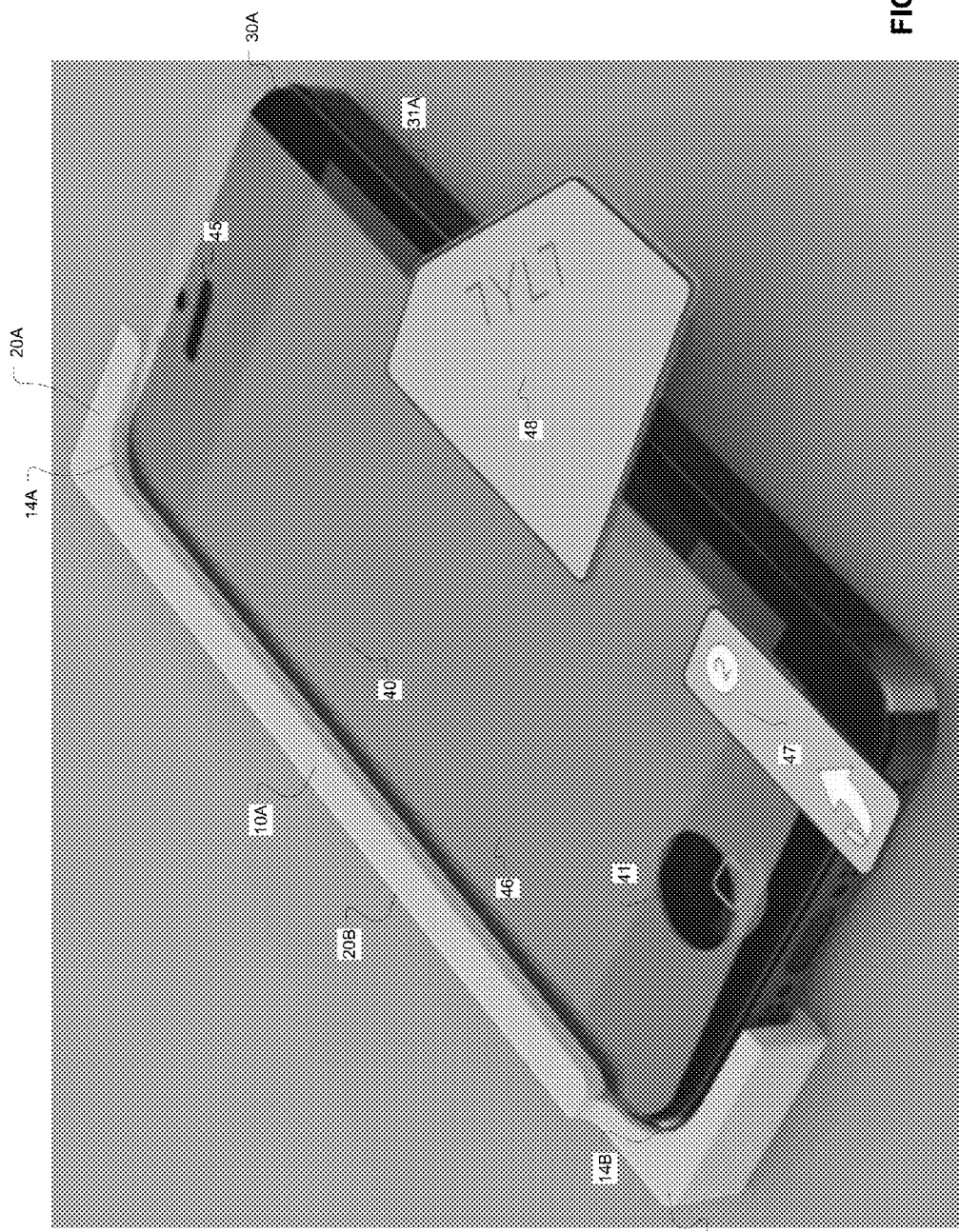
FIG. 7G is a simplified isometric diagram of PMP architecture including a protection module engaging a first registration extension at an angle and engaging a second, orthogonal registration extension of a PMP-AT and being rotated downward onto a coupled device surface according to various embodiments.
Figure 7H:
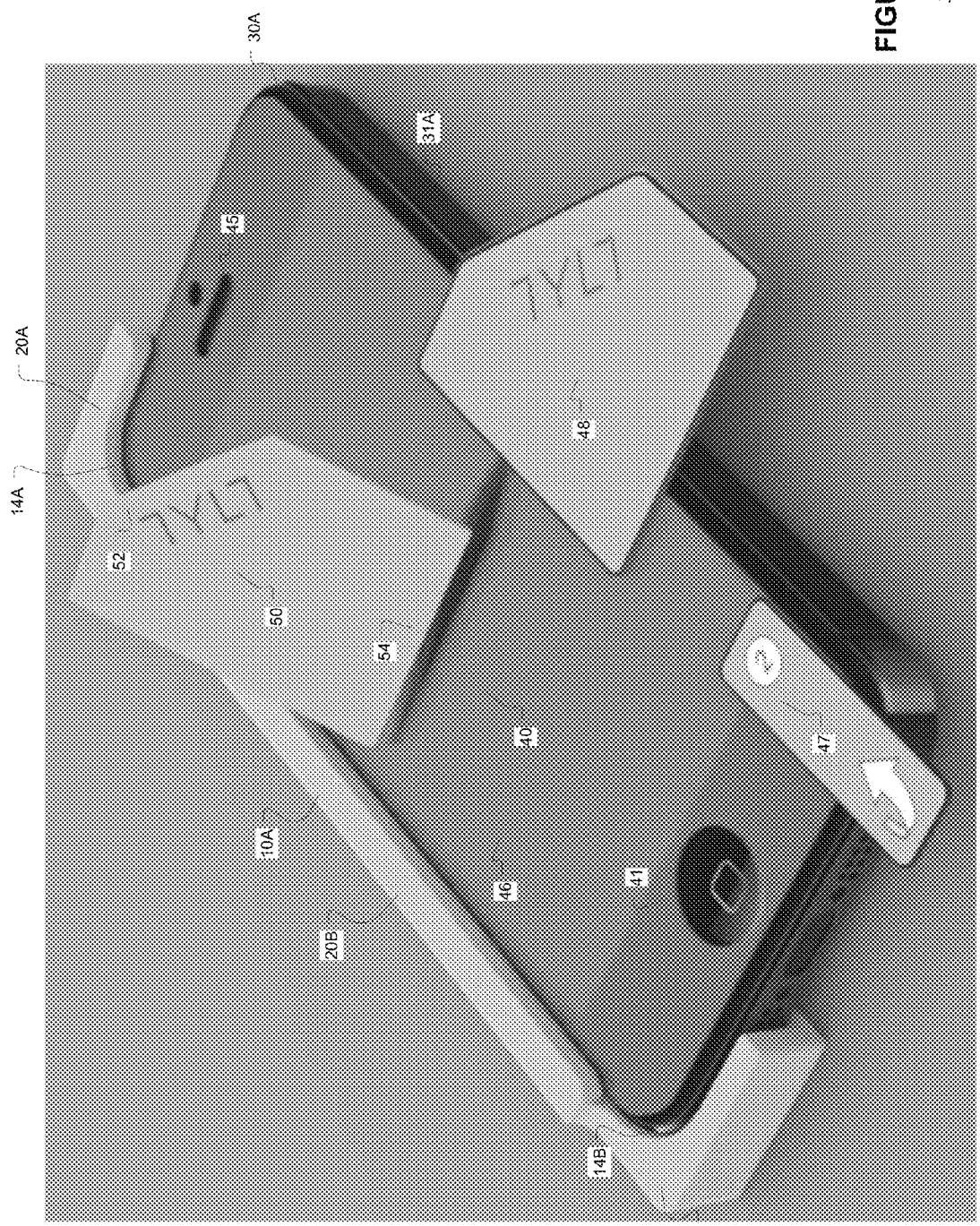
FIG. 7H is a simplified isometric diagram of PMP architecture including a protection module engaging a first registration extension at an angle and engaging a second, orthogonal registration extension of a PMP-AT, rotated downward onto a coupled device surface, and squeegee being advanced to the placement module according to various embodiments.

Thereafter, a user may then rotate the protection module 40 right edge (the adhesive section 44 in an embodiment) onto the device's 30A face 34A to be covered while maintaining engagement with both extensions 20A, 20B (activity 134) and shown in FIG. 7G. A user may continue to rotate the protection module 40 downward until the protection module 40 adhesive section 44 is coupled to the device's 30A surface 34A as shown in FIG. 7H. As shown in FIG. 7H, one or more ports 41, 45 of the protection module 40 may coincide with the device's 30A ports 36A, 38A including a button 36 and speaker ports 38 in an embodiment.

A user may then use a straight edge device including a squeegee (50 FIG. 5C) to remove possible air bubbles as shown in FIGS. 7H and 7I (activity 138). A user may employ the squeegee 50 by gripping or holding area 52 and applying the straight edge 54 to the protection module 40 removable front layer 46. The squeegee process may smooth any bubbles between the main protection layer 49 and the device's 30A surface 34A. In an embodiment, a user may then expose the protection module 40 main protection layer 49 by removing the front layer 46 (activity 138). A user may employ the front layer tab 47 to remove the front layer 46.

Figure 8:
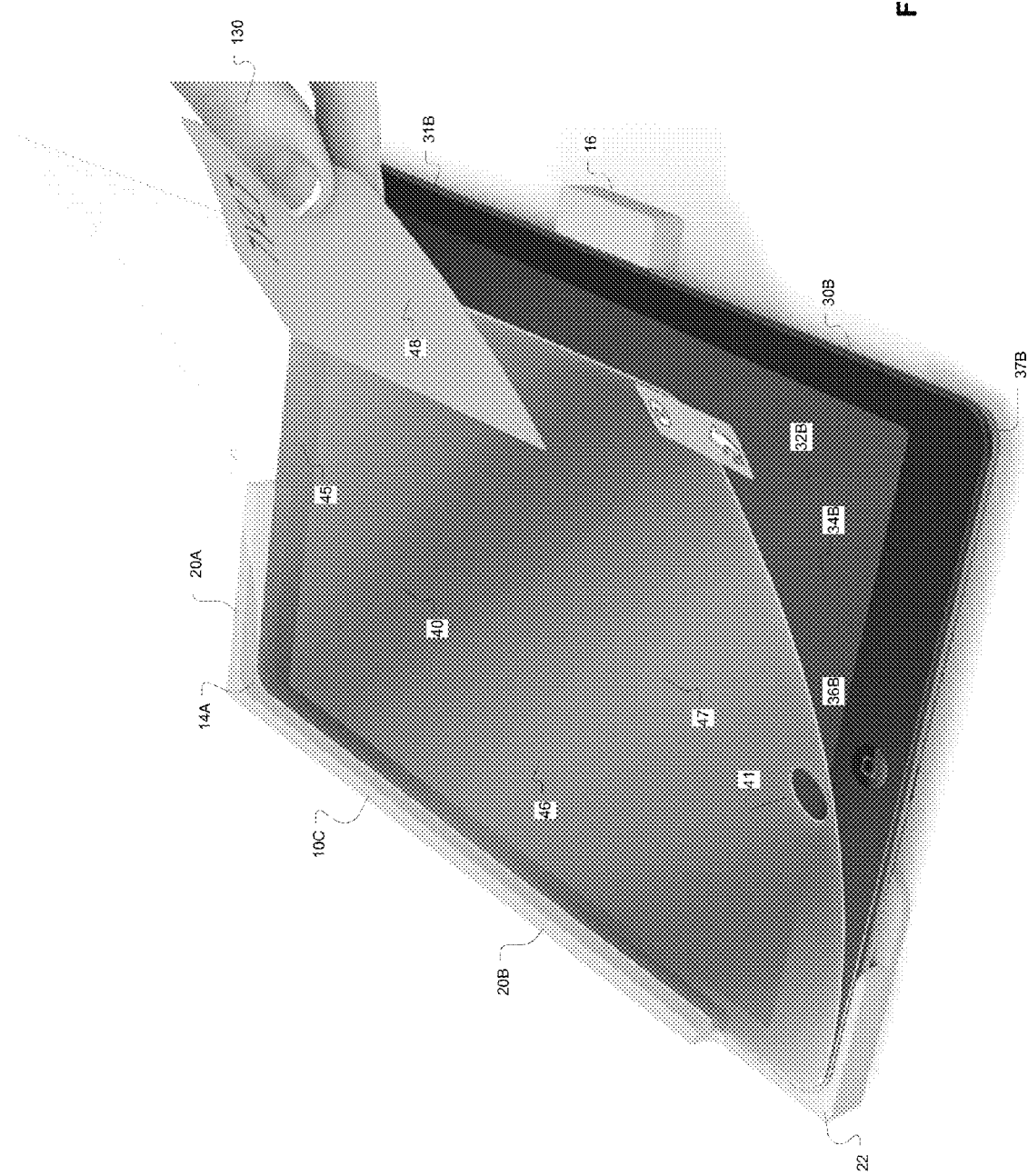
FIG. 8 is a simplified isometric diagram of PMP architecture including a protection module engaging a first registration extension at an angle and engaging a second, orthogonal registration extension of a PMP-AT and being rotated downward onto another coupled device surface according to various embodiments.

In an embodiment, the main protection layer 49 may be comprised of one or more removable layers. In such an embodiment, a user 130 may remove one of several main protection layers 49 to expose a clearer layer when the topmost layer 49 has been damaged. FIG. 8 is a simplified isometric diagram of PMP architecture 100C including a protection module 40 engaging a first registration extension 20B at an angle and engaging a second, orthogonal registration extension 20A of a PMP-AT 10C in preparation for being rotated downward onto another coupled device surface according to various embodiments. As shown in FIG. 8, a PMP-AT 10C may be sized and configured for mating and engaging a tablet device 30B. The tablet device 30B may include a surface 34B to be protected. The tablet device 30B may include a perimeter 31B, a screen 32B, a lower port or button 36B. The protection module 40 may be sized for the tablet device 30B including the surface 34B.

Figure 3A:
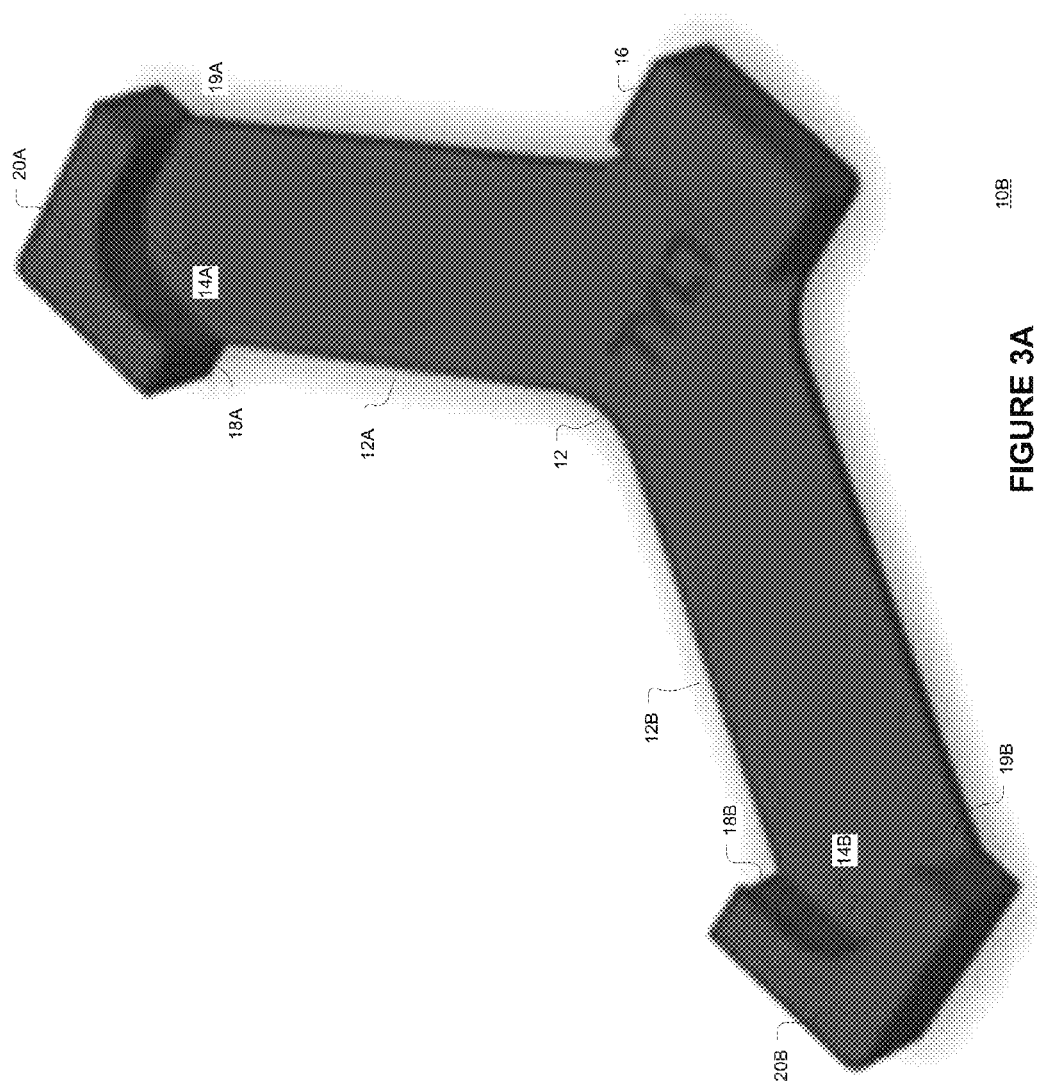
FIG. 3A is a simplified isometric diagram of another PMP-AT according to various embodiments.

Other embodiments of protection module placement alignment tools are possible within the scope of the present invention. An embodiment of a PMP-AT may enable a user 130 to nest a device 30A, 30B within the PMP-AT with a surface 34A, 34B to be covered exposed at the PMP-AT top. A PMP-AT according to various embodiments may include one or more registrations to enable a user 130 to accurately and precisely place a protection module 40 on desired device 30A, 30B surfaces 34A, 34B. FIG. 3A is a simplified isometric diagram and FIG. 3B is a simplified top view diagram of another PMP-AT 10B according to various embodiments.

Figure 3B:
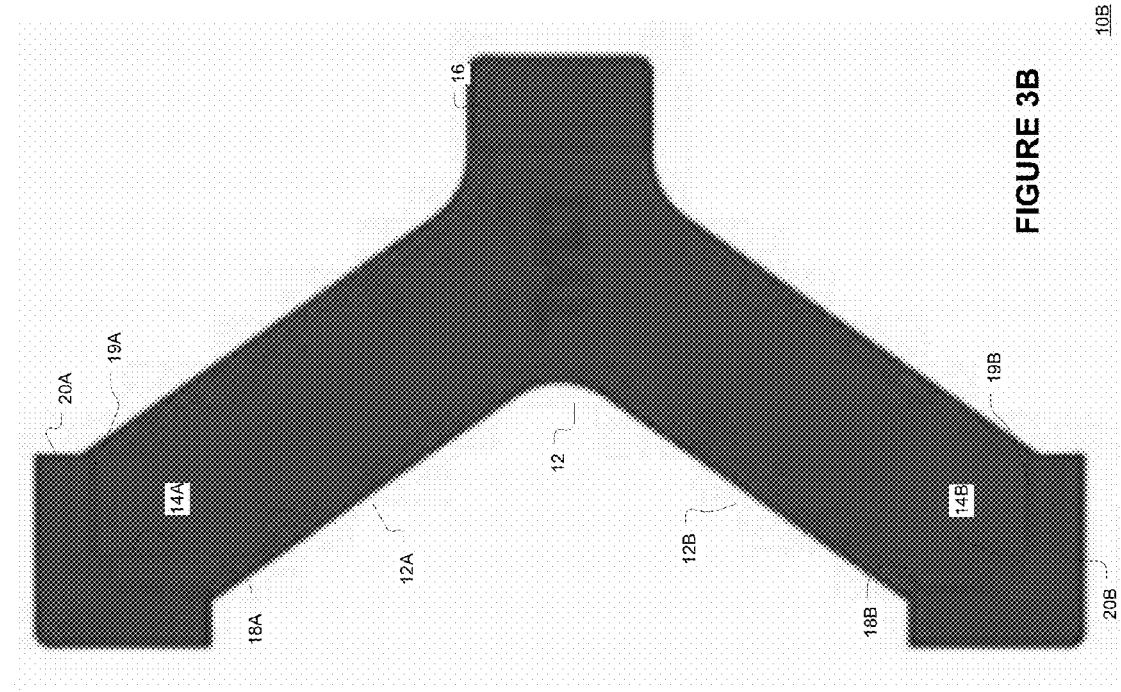
FIG. 3B is a simplified top diagram of a PMP-AT according to various embodiments.

A user 130 may employ the PMP-AT 10B shown in FIGS. 3A-3B to place a protection module (40, FIG. 2) on a device 30A, 30B surface 34A, 34B according to various embodiments. As shown in FIGS. 3A, 3B, the PMP-AT 10B may include a central base 12, a base upper arm 12A, a base lower arm 12B, a base extension registration tab 16, an upper alignment area registration corner 14A, a lower alignment area registration corner 14B, a base upper vertical extension or wall 18A, a lower base vertical extension 18B, an upper horizontal extension or wall 19A, a lower horizontal extension or wall 19B, an upper alignment area registration extension 20A, and a lower alignment area registration extension 20B.

Similar to PMP-AT 10A, a base 12 upper arm 12A may extend from the base 12 to the upper alignment area registration corner 14A. The base 12 lower arm 12B may extend from the base 12 to the lower alignment area registration corner 14B. The base extension registration tab 16 may be located between the base 12 upper arm 12A and the base 12 lower arm 12B. The extension tab 16 may be offset from the central base 12. In an embodiment, the upper horizontal alignment area registration extension 20A may extend downwardly toward the lower alignment area registration corner 14B. The lower horizontal alignment area registration extension 20B may extend upwardly toward the upper alignment area registration corner 14A.

In an embodiment, the PMP-AT 10B a central base 12, a base upper arm 12A, a base lower arm 12B, a base extension registration tab 16, an upper alignment area registration corner 14A, a lower alignment area registration corner 14B, a base upper vertical extension or wall 18A, a lower base vertical extension 18B, an upper horizontal extension or wall 19A, a lower horizontal extension or wall 19B, an upper alignment area registration extension 20A, and a lower alignment area registration extension 20B may be sized to nest about a device 30A, 30B while exposing a specific and exact section of the device's 30A, 30B surface 34A, 34B, The device's 30A, 30B surface 34A, 34B may be covered by a protection module 40 by advancing the module 40 to the an upper alignment area registration extension 20A, and a lower alignment area registration extension 20B. A user 130 may then rotate the protection module 40 onto the device's 30A, 30B surface 34A, 34B similar to PMP-AT 10A, 10C as described above.

Similar to PMP-AT 10A, 10C, a PMP-AT 10B as shown in FIGS. 3A, 3B lower alignment area registration corners 14A, 14B may have a particular radius or shape. In an embodiment, the corners 1A, 14B radius or shape may be sized to nest or securely hold a corresponding corner of a device 30A, 30B. The registration extensions 20A, 20B may also have a particular radius or shape that is sized to expose a specific section of a device's 30A, 30B surface 34A, 34B. In an embodiment, the height between corners 14B and 14A, heights of walls 18A, 18B, 19A, 19B and distance of the extension tab 16 from the base 12 mate a device's 30A, 30B perimeter 31A, 31B.

Figure 4B:
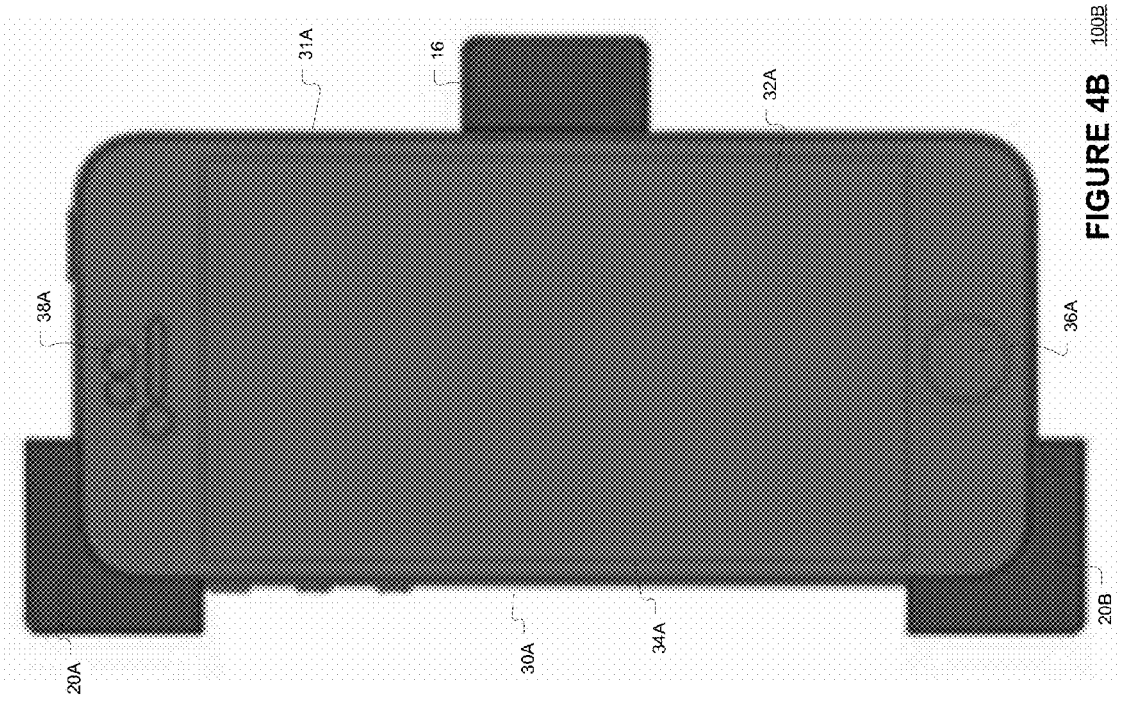
FIG. 4B is a simplified top diagram of PMP architecture according to various embodiments.

FIG. 4A is a simplified isometric diagram and FIG. 4B is a simplified top view diagram according to various embodiments. As shown in FIGS. 4A, 4B, architecture 100B may include a device 30A, 30B nested in an PMP-AT 10B. In an embodiment, a protection module 40 may be precisely placed on a device's 30A, 30B surface 34A, 34B via the algorithm 120 shown in FIG. 6 via the alignment tool 10B.@@

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An alignment module for aligning a portion of a front surface of an electronic device for coupling with a protection module, the alignment module comprising:
    a base, a first portion of the base shaped to mate with at least a first segment of the electronic device and receive at least a first portion of the protection module for aligning the first portion of the protection module to the at least a first segment of the electronic device, the first segment of the electronic device being on a front side of the electronic device, a second portion of the base shaped to mate with at least a second segment of the electronic device, the second segment of the electronic device being on a rear side of the electronic device;
    a plurality of electronic device perimeter engaging modules configured to engage with a perimeter of the electronic device, each perimeter engaging module physically connected to the base and a combination of the base and plurality of electronic device perimeter engaging modules forming a structure that substantially prevents the at least a first segment of the electronic device from moving relative the plurality of electronic device perimeter engaging modules when the electronic device is mated with the base; and
    a first alignment registration module, the first alignment registration module extending over a rear surface of the electronic device and framing a first portion of the rear side of the electronic device, the first alignment registration module physically coupled to the base and one of the plurality of electronic device perimeter engaging modules; and
    a second alignment registration module, the second alignment registration module extending over the rear surface of the electronic device and framing a second portion of the rear side of the electronic device, the second alignment registration module physically coupled to the base and one of the plurality of electronic device perimeter engaging modules.

2. The alignment module of claim 1, wherein the electronic device is a portable electronic device.

3. The alignment module of claim 2, wherein the electronic device front surface includes a display.

4. The alignment module of claim 2, wherein the first segment includes a display.

5. The alignment module of claim 4, wherein the electronic device perimeter is substantially rectangular in shape.

6. The alignment module of claim 5, wherein first alignment registration module extends horizontally along a first wall of the electronic device perimeter and over the rear surface.

7. The alignment module of claim 6, wherein the second alignment registration module extends vertically along a second wall of the electronic device perimeter and over the rear surface, the second wall about orthogonal to the first wall.

8. The alignment module of claim 6, wherein the first alignment registration module extends horizontally over the rear surface and inwardly a predetermined first distance and the second alignment registration module extends vertically above the rear surface and inwardly a predetermined second distance to frame at least a portion of the electronic device.

9. The alignment module of claim 5, wherein one of the plurality of electronic device perimeter engaging modules is shaped to engage a side of the electronic device perimeter.

10. The alignment module of claim 9, wherein first alignment registration module extends above an electronic device perimeter engaging module shaped to engage a first corner of the electronic device perimeter and extends horizontally along an electronic device perimeter and over the rear surface.

11. The alignment module of claim 9, wherein second alignment registration module extends above an electronic device perimeter engaging module shaped to engage a first corner of the electronic device perimeter and extends horizontally along an electronic device perimeter and over the rear surface.

12. The alignment module of claim 9, wherein second alignment registration module extends above an electronic device perimeter engaging module shaped to engage a first corner of the electronic device perimeter and extends horizontally along an electronic device perimeter and over the rear surface.

13. The alignment module of claim 5, wherein one of the plurality of electronic device perimeter engaging modules is shaped to engage a first corner of the electronic device perimeter.

14. The alignment module of claim 13, wherein another of the plurality of electronic device perimeter engaging modules is shaped to engage a second corner of the electronic device perimeter, the second corner diagonally across from the first corner.

15. The alignment module of claim 13, wherein another of the plurality of electronic device perimeter engaging modules is shaped to engage a second corner of the electronic device perimeter, the second corner on the same side and below the first corner.

16. The alignment module of claim 15, wherein another of the plurality of electronic device perimeter engaging modules is shaped to engage a side wall of the electronic device perimeter, the side wall opposite the side spanned by the first and second corner of the electronic device perimeter.

17. The alignment module of claim 16, wherein first alignment registration module extends horizontally along a first wall of the electronic device perimeter and over the rear surface.

18. The alignment module of claim 17, wherein second alignment registration module extends vertically along a second wall of an electronic device perimeter and over the rear surface, the second wall about orthogonal to the first wall.

19. The alignment module of claim 18, wherein the first alignment registration module extends horizontally above the rear surface and inwardly a predetermined first distance and the second alignment registration module extends vertically over the front surface and inwardly a predetermined second distance to frame at least a portion of the electronic device.

20. The alignment module of claim 2, wherein the first segment is substantially a display.

21. A system for protecting at least a portion of a front surface of an electronic device, the system comprising:
an alignment module, comprising:
a main protection layer, the main protection layer having a size and shape conforming to the front surface of the electronic device;
a base portion;
a first alignment portion having a shape for mating with a first corner of the electronic device, the first alignment portion configured to extend over at least the portion of the front surface of the electronic device and extend over a least a portion of a rear surface of the electronic device and configured to align at least a portion of the main protection layer to the first corner of the electronic device;
a second alignment portion having a shape for mating with a second corner of the electronic device;
a first alignment registration module, the first alignment registration module extending from the base portion to the first alignment portion; and
a second alignment registration module, the second alignment registration module extending from the base portion to the second alignment portion.

22. The protection system of claim 21, wherein the electronic device front surface is substantially planar and the main protection layer is substantially planar.

23. The protection system of claim 22, further comprising an adhesive section on a back surface of the main protection layer.

24. The protection system of claim 23, wherein the first alignment portion is configured to receive the first corner of the electronic device at an angle prior to the second alignment portion engaging the second corner of the electronic device.

25. The protection system of claim 23, wherein the first alignment portion is configured to receive the first corner of the electronic device at an angle prior to being rotated relative to the electronic device to engage the second corner of the electronic device with the second alignment portion.

26. The protection system of claim 25, wherein the main protection layer further includes a removable tab for enabling a user to advance the main protection layer into the first alignment portion at another angle relative to the base portion and to enable the user to rotate the main protection layer downward, relative to the base portion, to engage the second alignment portion with the second corner of the electronic device.

27. The protection system of claim 21, wherein the main protection layer includes an opening positioned to coincide with an electronic device surface element.

28. The protection system of claim 21, wherein the second corner of the electronic device is on the same side and below the first corner of the electronic device.

29. A method of protecting a portion of a front surface of an electronic device (ED), the method comprising:
inserting a electronic device rear surface in an alignment module, the electronic device front surface, an outer perimeter formed about a perimeter of the electronic device front surface and the rear surface, the alignment module including a base and a plurality of electronic device perimeter engaging modules, each perimeter engaging module physically connected to the base and a combination of the base and plurality of electronic device perimeter engaging modules forming a structure that substantially prevents the electronic device rear surface from moving relative the plurality of electronic device perimeter engaging modules when the electronic device rear surface is inserted into the alignment module, the alignment module further including a first alignment registration module, the first alignment registration module extending over the rear surface and framing a first portion of the rear surface when the electronic device rear surface is inserted in the alignment module, the first alignment registration module physically coupled to the base and one of the plurality of electronic device perimeter engaging modules and a second alignment registration module, the second alignment registration module extending over the rear surface and framing a second portion of the rear surface when the electronic device rear surface is inserted in the alignment module, the second alignment registration module physically coupled to the base and one of the plurality of electronic device perimeter engaging modules;

advancing a protection module including a main protection layer that is sized and shaped to conform to the electronic device front surface at a first angle to engage the first alignment registration module and the second alignment registration module, the protection module shaped to engage the first alignment registration module and the second alignment registration module; and rotating the protection module downward to engage the electronic device front surface after advancing the protection module to engage the first alignment registration module and the second alignment registration module at a second angle.

30. The method of claim 29, wherein the protection module further includes a removable front layer removably coupled to a front surface of the main protection layer, the front layer including a placement tab sized and positioned to enable a user to manipulate the protection module, the method further including employing the placement tab to advance the protection module to the first alignment registration module and the second alignment registration module at a third angle prior to be rotating the protection module downward to engage the electronic device front surface and removing the front layer when the protection module has been rotated downward to engage the electronic device front surface.

31. The method of claim 30, wherein the protection module includes an adhesive section on a back surface of the main protection layer and the protection module further includes a removable back layer removably coupled to the main protection layer back surface adhesive section, the removable back layer including a removable tab and the method further comprising removing the removable back layer to expose the adhesive section prior to advancing the protection module to the first alignment registration module and the second alignment registration module at a fourth angle.

32. The method of claim 31, wherein the main protection layer includes an opening positioned to coincide with an electronic device surface element.

* * * * *